United States Patent
Adachi

(10) Patent No.: US 9,507,453 B2
(45) Date of Patent: Nov. 29, 2016

(54) PROXIMITY DETECTION DEVICE, METHOD OF DETECTING PROXIMITY AND ELECTRONIC APPARATUS

(71) Applicant: Japan Display Inc., Tokyo (JP)

(72) Inventor: Koichiro Adachi, Aichi (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 14/956,912

(22) Filed: Dec. 2, 2015

(65) Prior Publication Data

US 2016/0085351 A1    Mar. 24, 2016

Related U.S. Application Data

(62) Division of application No. 13/740,598, filed on Jan. 14, 2013, now Pat. No. 9,235,282.

(30) Foreign Application Priority Data

Feb. 28, 2012  (JP) ................. 2012-040842

(51) Int. Cl.
   *G06F 3/041*     (2006.01)
   *G06F 3/044*     (2006.01)

(52) U.S. Cl.
   CPC ............ *G06F 3/0412* (2013.01); *G06F 3/041* (2013.01); *G06F 3/044* (2013.01); *G06F 2203/04108* (2013.01)

(58) Field of Classification Search
   CPC ...... G06F 3/044; G06F 3/0412; G06F 3/041; G06F 2203/04112; G02F 1/13338
   USPC ................................. 345/173, 174
   See application file for complete search history.

(56) References Cited

U.S. PATENT DOCUMENTS

| | | | |
|---|---|---|---|
| 2009/0066669 A1* | 3/2009 | Olson | G06F 3/04883 345/174 |
| 2009/0213090 A1 | 8/2009 | Mamba et al. | |
| 2009/0256818 A1 | 10/2009 | Noguchi et al. | |
| 2009/0273577 A1 | 11/2009 | Chen et al. | |
| 2010/0214262 A1* | 8/2010 | Ishizaki | G02F 1/13338 345/174 |
| 2011/0018838 A1 | 1/2011 | Lee | |

(Continued)

FOREIGN PATENT DOCUMENTS

| | | |
|---|---|---|
| CN | 101556783 | 10/2009 |
| CN | 101814256 | 8/2010 |

(Continued)

OTHER PUBLICATIONS

Japanese Office Action issued Mar. 24, 2015 in corresponding Japanese Application No. 2012-040842.

(Continued)

*Primary Examiner* — Koosha Sharifi-Tafreshi
(74) *Attorney, Agent, or Firm* — K&L Gates LLP

(57) ABSTRACT

A proximity detection device includes a display unit which has a display image surface in which a plurality of pixel electrodes are arranged in a matrix shape and a proximity operation detecting unit in which a transparent electrode for proximity operation detection is arranged to form an operation surface at a position superposed on the display image surface and a conductive film pattern forming the transparent electrode has a pitch of a linear pattern which is equal to or smaller than an arrangement pitch in one direction of the pixel electrodes.

9 Claims, 17 Drawing Sheets

(56) References Cited

U.S. PATENT DOCUMENTS

| | | |
|---|---|---|
| 2011/0095996 A1 | 4/2011 | Yilmaz |
| 2011/0102361 A1 | 5/2011 | Phillipp |
| 2012/0098782 A1* | 4/2012 | Nam ................ G06F 3/044 345/174 |
| 2014/0293154 A1 | 10/2014 | Philipp |

FOREIGN PATENT DOCUMENTS

| | | |
|---|---|---|
| CN | 102053751 | 5/2011 |
| JP | 2004-334249 | 11/2004 |
| JP | 2007-264393 | 10/2007 |
| JP | 2008-282001 | 11/2008 |
| JP | 2010-097536 | 4/2010 |
| JP | 2010-250770 | 11/2010 |
| JP | 2011-013881 | 1/2011 |
| JP | 2011-138154 | 7/2011 |
| JP | 4862969 | 1/2012 |

OTHER PUBLICATIONS

Taiwan Office Action issued Mar. 31, 2015 in corresponding Taiwan Application No. 101141946.

* cited by examiner

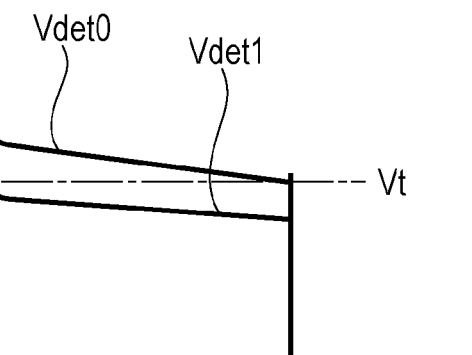
FIG. 3A
FIG. 3B
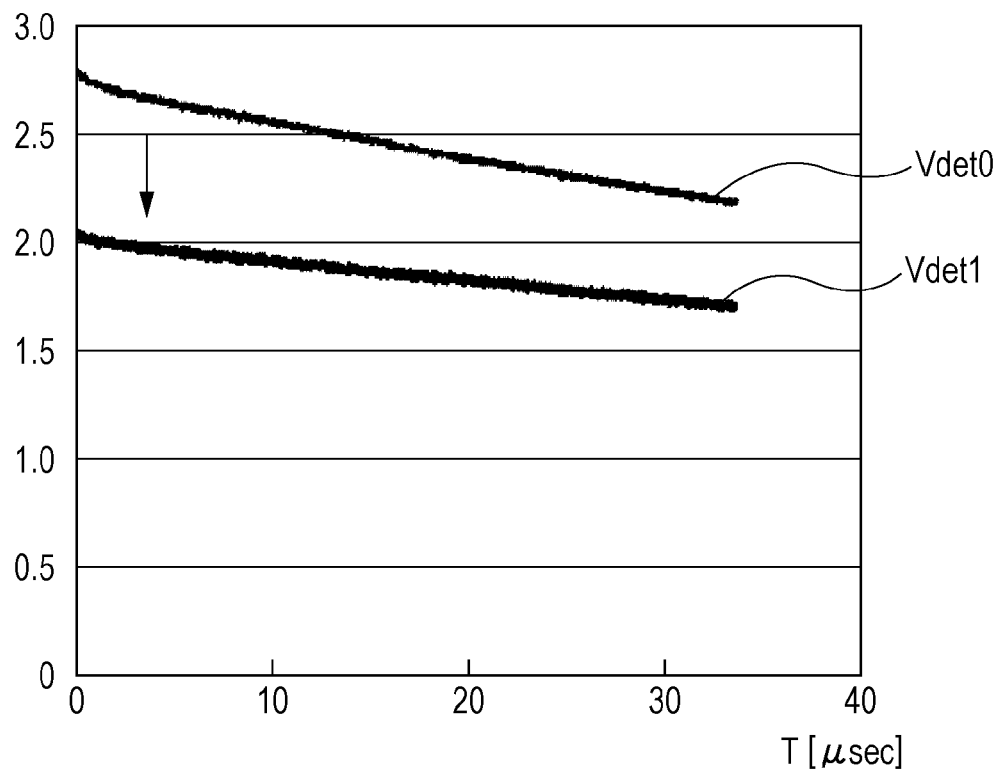
FIG. 3C

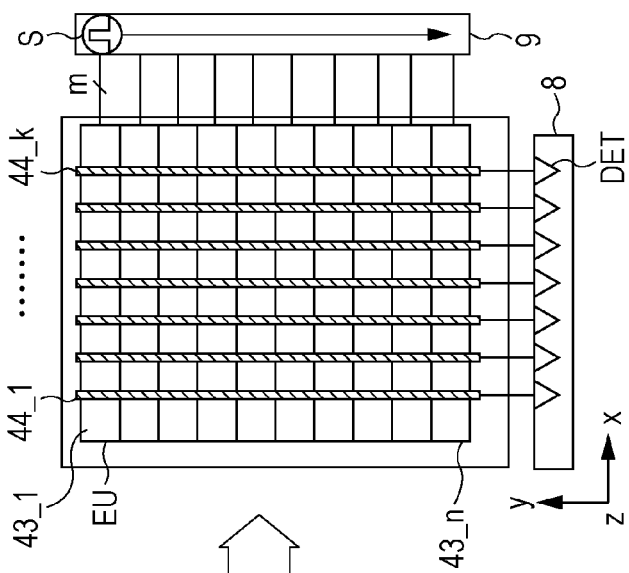
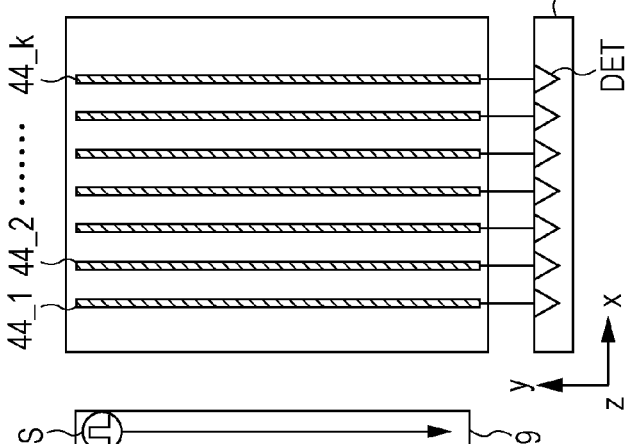
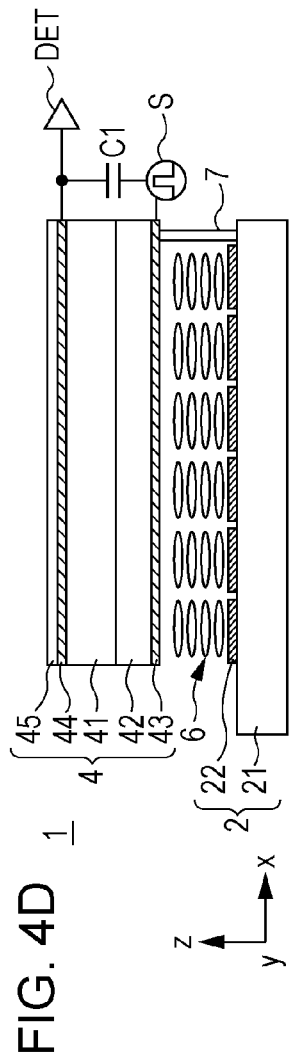

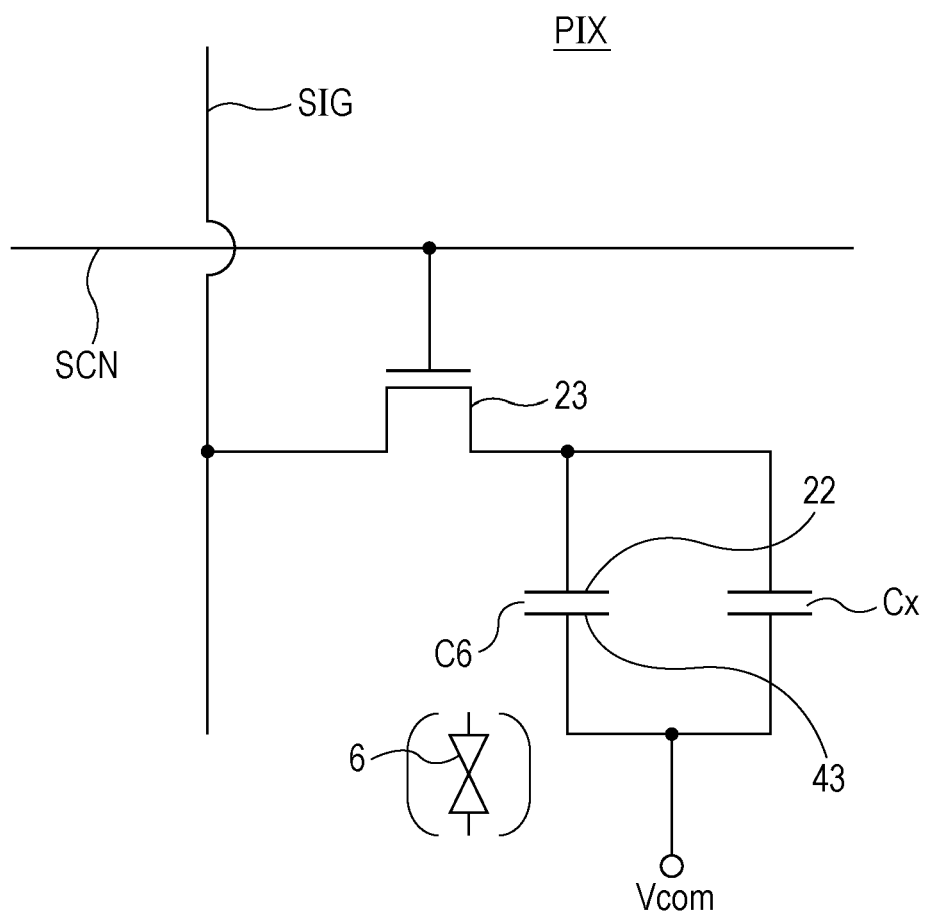

PROXIMITY DETECTION DEVICE, METHOD OF DETECTING PROXIMITY AND ELECTRONIC APPARATUS

CROSS REFERENCES TO RELATED APPLICATIONS

The present application is a division of U.S. patent application Ser. No. 13/740,598, filed Jan. 14, 2013, which application claims priority to Japanese Priority Patent Application JP 2012-040842 filed in the Japan Patent Office on Feb. 28, 2012, the entire content of which is hereby incorporated by reference.

BACKGROUND

The present disclosure relates to a proximity detection device in which a proximity operation detecting unit is superposed on a display surface, a method of detecting proximity thereof and an electronic apparatus including the proximity detection device.

For example, a so-called display device with a touch sensor in which a proximity detecting unit which detects contact or an approach of a finger, a pen and the like on a screen is provided in the display surface such as a liquid display panel has been widely known.

In the specification, terms of "touch" and "proximity" are used and any of the terms is used for the meanings including both "contact" and "approach".

In the display device with a touch sensor, while a detection electrode and a driving electrode are arranged to be superposed on a display screen as a transparent electrode for touch detection, the transparent electrode is not completely transparent so that there has been a demand for inconspicuousness of a transparent electrode pattern to maintain display image quality.

In Japanese Unexamined Patent Application Publication No. 2011-138154, technology to improve inconspicuousness of a transparent electrode pattern is disclosed.

In addition, technology which prevents moiré by interference between a prism array and a pixel array to improve display image quality is disclosed in Japanese Unexamined Patent Application Publication No. 2007-264393.

SUMMARY

While the reduction of moiré is demanded in the display device with a touch sensor, contrast patterns (moiré fringes) are generated by interference between a pixel pitch of the display panel and a transparent electrode pattern pitch for a touch sensor. In particular, when pixels of R (red), G (green) and B (blue) are added to a W (white) pixel in a panel pixel layout, luminance contrast becomes strong by an influence of the white pixel that has a tendency to emphasize the moiré fringes.

Further, there is a demand to maintain or improve touch sensor properties (touch detection sensitivity) and inconspicuousness of the transparent electrode.

It is desirable to maintain touch sensor properties and inconspicuousness of a transparent electrode, while moiré fringes generated due to interference between a panel pixel and a transparent electrode pattern pitch for a touch sensor are reduced in the present disclosure.

According to an embodiment the present disclosure, there is provided a proximity detection device including a display unit which has a display image surface in which a plurality of pixel electrodes are arranged in a matrix shape and a proximity operation detecting unit in which a transparent electrode for proximity operation detection is arranged to form an operation surface at a position superposed on the display image surface and a conductive film pattern forming the transparent electrode has a pitch of a linear pattern which is equal to or smaller than an arrangement pitch in one direction of the pixel electrodes.

According to another embodiment of the present disclosure, there is provided an electronic apparatus including the proximity detection device.

According to still another embodiment of the present disclosure, there is provided a method of detecting proximity including detecting a proximity operation by using a transparent electrode with a conductive film pattern having a pitch of a linear pattern which is equal to or smaller than an arrangement pitch in one direction of pixel electrodes in a proximity detection device in which the transparent electrode for proximity operation detection is arranged to form an operation surface at a position superposed on a display image surface in which a plurality of the pixel electrodes are arranged in a matrix shape.

According to still another embodiment of the present disclosure, there is provided a proximity detection device including a display unit which has a display image surface in which a plurality of pixel electrodes are arranged in a matrix shape and a proximity operation detecting unit in which a transparent electrode for proximity operation detection is arranged to form an operation surface at a position superposed on the display image surface and a spot-like non-conductive portion is formed in a conductive film pattern forming the transparent electrode.

According to still another embodiment of the present disclosure, there is provided an electronic apparatus including the proximity detection device.

According to still another embodiment of the present disclosure, there is provided a method of detecting proximity including detecting a proximity operation by using a transparent electrode with a conductive film pattern in which a spot-like non-conductive portion is formed in a proximity detection device in which the transparent electrode for proximity operation detection is arranged to form an operation surface at a position superposed on a display image surface in which a plurality of the pixel electrodes are arranged in a matrix shape.

According to still another embodiment of the present disclosure, there is provided a proximity detection device including a display unit which has a display image surface in which a plurality of pixel electrodes are arranged in a matrix shape and a proximity operation detecting unit in which a transparent electrode for proximity operation detection is arranged to form an operation surface at a position superposed on the display image surface and a conductive film pattern forming the transparent electrode is a pattern of a continuous bending line or wavy line.

According to still another embodiment of the present disclosure, there is provided an electronic apparatus including the proximity detection device.

According to still another embodiment of the present disclosure, there is provided a method of detecting proximity including detecting a proximity operation by using a transparent electrode having a conductive film pattern of a continuous bending line or wavy line in a proximity detection device in which the transparent electrode for proximity operation detection is arranged to form an operation surface at a position superposed on a display image surface in which a plurality of the pixel electrodes are arranged in a matrix shape.

According to the embodiments of the present disclosure, as the pitch in the linear pattern as the conductive film pattern forming the transparent electrode is narrowed, the spot-like non-conductive portion is formed, or the continuous bending line or wavy line is patterned.

According to the embodiments of the present disclosure, it is possible to realize moiré reduction, maintenance or improvement of touch detection sensitivity and inconspicuousness of a transparent electrode by narrowing a pitch in a linear pattern as a conductive film pattern forming a transparent electrode, forming a spot-like non-conductive portion or patterning a continuous bending line or wavy line.

Additional features and advantages are described herein, and will be apparent from the following Detailed Description and the figures.

BRIEF DESCRIPTION OF THE FIGURES

FIGS. 3A to 3C are illustration diagrams of input and output waveforms of the touch sensor unit according to the embodiment;

FIGS. 4A to 4D are illustration diagrams of a structure of a liquid crystal display device according to the embodiment;

FIG. 5 is an equivalent circuit diagram of a pixel of the liquid crystal display device according to the embodiment;

DETAILED DESCRIPTION

Figure 1A:
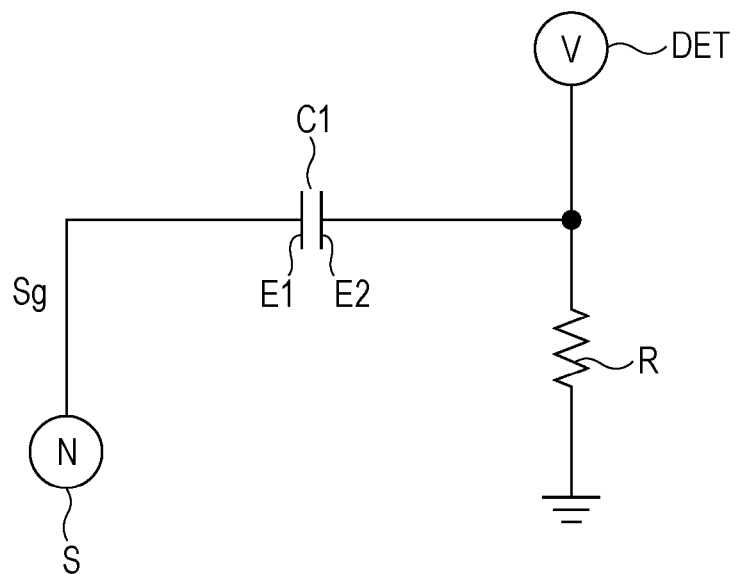
FIGS. 1A and 1B are illustration diagrams of operation of a touch sensor unit according to an embodiment of the present disclosure.

Hereafter, as embodiments of a proximity detection device of the present disclosure, a liquid crystal display device with a touch sensor in which a touch sensor function is integrally formed in a display panel will be described. The description will be made in the following order.

1. Basic Configuration and Operation of Touch Detection
2. Configuration of Liquid Crystal Display Device
3. Detection Electrode of First Embodiment
4. Detection Electrode of Second Embodiment
5. Detection Electrode of Third Embodiment
6. Detection Electrode of Fourth Embodiment
7. Modification Examples and Application Examples

1. BASIC CONFIGURATION AND OPERATION OF TOUCH DETECTION

A detection electrode and a driving electrode are provided in a touch sensor. For example, while the detection electrode is provided on a side in which a finger approaches on a panel surface side, the other electrode which is provided on an inner side of the panel with respective to the detection electrode and forms an electrostatic capacitance for detection between the detection electrode and the other electrode is the driving electrode.

The driving electrode may be the driving electrode dedicated to the touch sensor. However, as a desirable thinner configuration, the driving electrode is described as a combined electrode which performs scanning driving of the touch sensor and so-called VCOM driving of an image display device at the same time in the liquid crystal display device of the embodiment.

Accordingly, an electrode to which a common driving signal VCOM for a liquid crystal display is applied is referred to as a counter electrode in the following description. However, this "counter electrode" refers to the same electrode as the "driving electrode" for driving the touch sensor and the same reference numerals like "counter electrode 43" and "driving electrode 43" are used in FIGS. 4A to 5 and the like.

First, the basics of touch detection in the liquid crystal display device of the embodiment will be described with reference to FIGS. 1A to 3C.

Figure 1B:
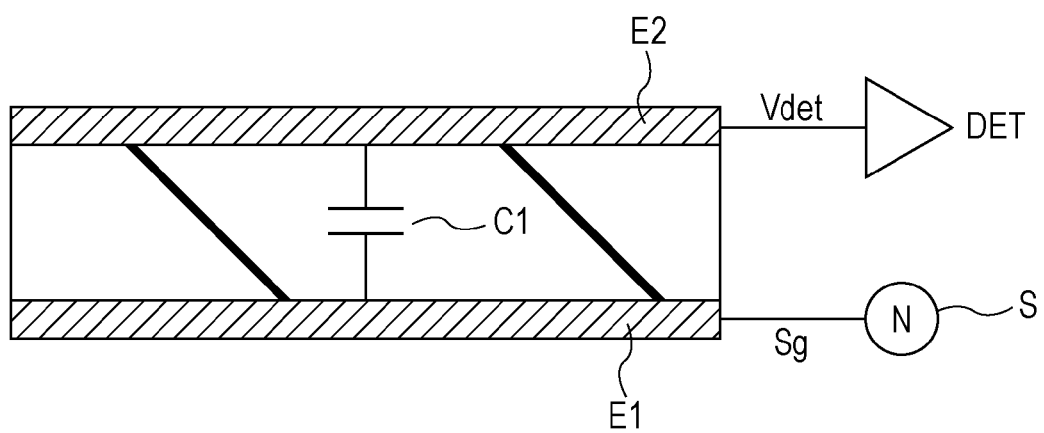
Figure 2A:
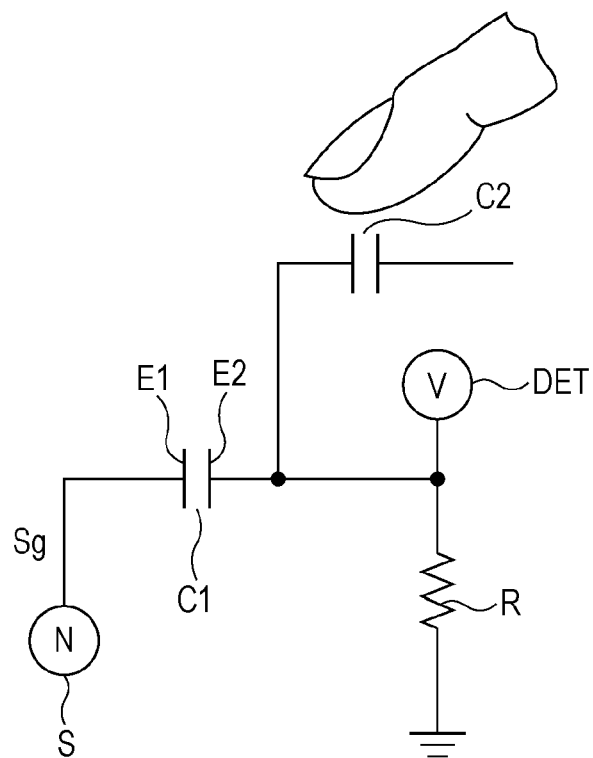
FIGS. 2A and 2B are illustration diagrams of the operation of the touch sensor unit according to the embodiment.
Figure 2B:
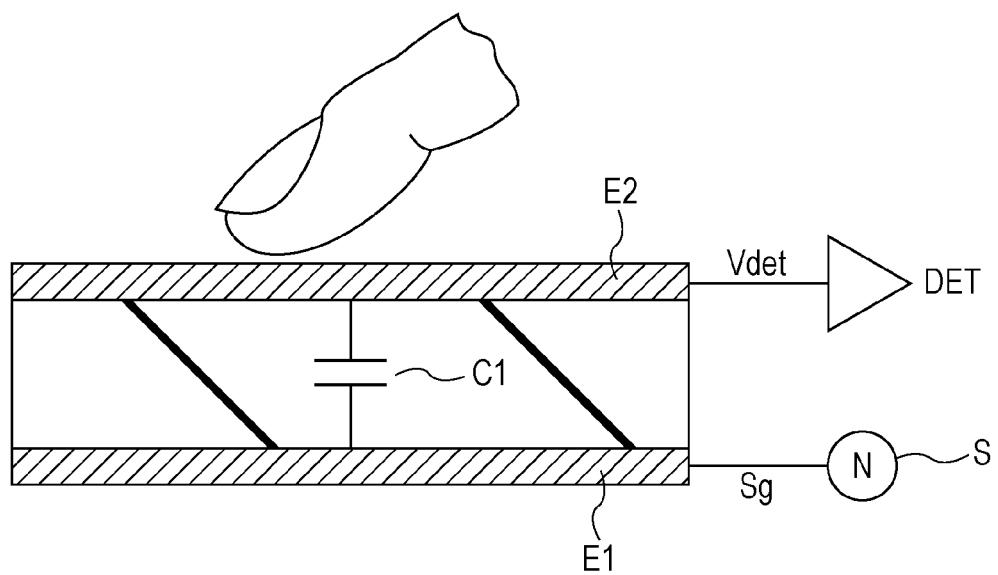

FIGS. 1A and 2A are equivalent circuit diagrams of a touch sensor unit and FIGS. 1B and 2B are structure diagrams (schematic cross-sectional views) of the touch sensor unit. Here, FIGS. 1A and 1B show a case where a finger as an object to be detected does not approach to the sensor, and FIGS. 2A and 2B show a case where a finger approaches or is in contact with the sensor, respectively.

The touch sensor unit shown in the drawings is an electrostatic capacitance type touch sensor and is made up of capacitive elements as shown in FIGS. 1B and 2B. Specifically, a capacitative element (electrostatic capacitance) C1 includes a dielectric body and a pair of electrodes arranged to face each other with the dielectric body being interposed therebetween, that is, the driving electrode E1 and the detection electrode E2.

As shown in FIGS. 1A and 2A, the driving electrode E1 of the capacitative element C1 is connected to an AC signal source S which generates an AC pulse signal Sg and the detection electrode E2 of the capacitative element C1 is connected to a voltage detector DET. At this time, the detection electrode E2 is grounded through a resistor R so as to electrically fix a DC level.

The AC pulse signal Sg having a predetermined frequency, for example, about several [kHz] to tens [kHz] is applied from the AC signal source S to the driving electrode E1. The waveform diagram of the AC pulse signal Sg is shown in FIG. 3B as an example.

Then, the output waveform (detection signal Vdet) as shown in FIG. 3A is generated in the detection electrode E2.

Also, the embodiment as described above is an example in which the driving electrode E1 corresponds to the counter electrode for driving a liquid crystal (a common electrode for plural pixels facing pixel electrodes). An AC driving which is referred to as so-called Vcom reversing driving is performed on the counter electrode for driving a liquid crystal. Therefore, in the embodiment, the common driving signal Vcom for Vcom reversing driving is used as the AC pulse signal Sg to drive the driving electrode E1 for the touch sensor.

In a state shown in FIGS. 1A and 1B in which a finger does not approach, the AC drive is performed on the driving electrode E1 of the capacitative element C1 and the AC detection signal Vdet is generated in the detection electrode E2 in accordance with the discharge or charge thereof. The detection signal will be represented as an "initial detection signal Vdet0" at this time below.

While the detection electrode E2 side is DC-grounded, since the detection electrode E2 side is not grounded from the viewpoint of a high frequency, a discharging path for an AC is not present and a pulse peak value of the initial detection signal Vdet0 is relatively large. However, when the time elapses after the AC pulse signal Sg rises, the pulse peak value of the initial detection signal Vdet0 gradually falls due to a loss.

In FIG. 3C, the waveform is enlarged in accordance with the scale. The pulse peak value of the initial detection signal Vdet0 falls from the initial value of 2.8 [V] to 0.5 [V] by a high frequency loss as some time elapses.

When a finger is in contact with or approaches to the detection electrode E2 within an effective point-blank distance from the initial state, a circuit state is changed into an equivalent state in a case where a capacitative element C2 is connected to the detection electrode E2 as shown in FIG. 2A. This is because a human body is equivalent to a capacitance of which one side is grounded from the viewpoint of a high frequency.

In the contact state, a discharging path for the AC signal through the capacitative elements C1 and C2 is formed. Accordingly, in accordance with the discharge or charge of the capacitative elements C1 and C2, an AC respectively flows through the capacitative elements C1 and C2. Therefore, the initial detection signal Vdet0 is voltage-divided into a value determined by a ratio of the capacitative elements C1 to C2 and the pulse peak value falls.

A detection signal Vdet1 shown in FIGS. 3A to 3C is a detection signal which is generated in the detection electrode E2 when a finger is in contact with the detection electrode E2. It is recognized that a falling amount of the detection signal is about 0.5 [V] to 0.8 [V] from FIG. 3C.

The voltage detector DET shown in FIGS. 1A to 2B detects the fall of the detection signal, for example, by using a threshold value Vth so as to detect contact of a finger.

2. CONFIGURATION OF LIQUID CRYSTAL DISPLAY DEVICE

The structure of the liquid crystal display device according to the embodiment will be described with reference to FIGS. 4A to 6.

FIGS. 4A to 4C are plan views particularly showing electrodes of the liquid crystal display device 1 and a circuit arrangement for driving or detecting the electrodes. In addition, FIG. 4D shows a schematic cross-sectional structure of the liquid crystal display device 1. FIG. 4D shows a cross-section of six pixels, for example, in a row direction (pixel display line direction).

Furthermore, FIG. 5 is an equivalent circuit diagram of pixels PIX which is formed in a matrix shape to a matrix direction in the liquid crystal display device 1.

Figure 6:
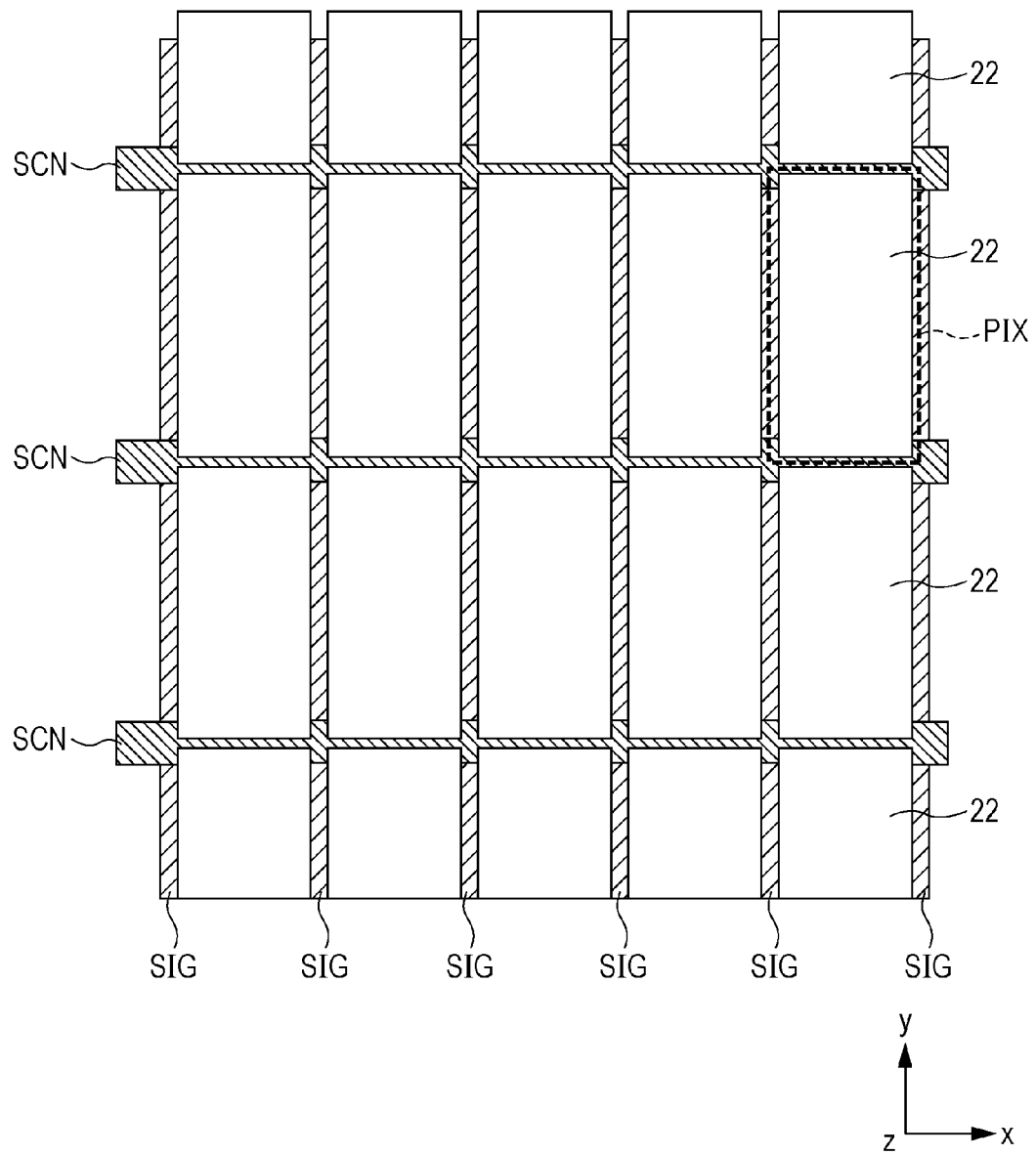
FIG. 6 is an illustration diagram of a pixel arrangement of the liquid crystal display device according to the embodiment.

Furthermore, FIG. 6 shows a pixel electrode arrangement state.

As shown in FIG. 5, each pixel PIX has a thin film transistor (TFT; hereinafter, referred to as TFT 23) as a select element of the pixel, an equivalent capacitance C6 of a liquid crystal layer 6 and a retentive capacitance (also, referred to as an additional capacitance) Cx. The electrode arranged in one side of the equivalent capacitance C6 representing the liquid crystal layer 6 is a pixel electrode 22 divided for each pixel and arranged in a matrix shape, and the electrode arranged in the other side is the counter electrode 43 common to plural pixels.

The pixel electrode 22 is connected to one of the source and the drain of the TFT 23, and a signal line SIG is connected to the other one of the source and the drain of the TFT 23. The signal line SIG is connected to a signal line driving circuit (not shown) so that a video signal having a signal voltage is supplied to the signal line SIG from the signal line driving circuit.

The common driving signal Vcom is provided in the counter electrode 43. The common driving signal Vcom is a signal which is obtained by reversing positive and negative potentials for each horizontal cycle (1H) with respect to the center potential.

The counter electrode 43 is a common electrode to the plural pixels PIX and the common driving signal Vcom to apply a reference voltage to the signal voltage for the gray-scale display for each pixel is applied.

The gate of the TFT 23 is electrically shared among all pixels PIX arranged in a row direction, that is, in a horizontal direction of the display screen so that a scanning line SCN is formed. The scanning line SCN is supplied with a gate pulse output from the scanning line driving circuit (not shown) for turning on or off the gate of the TFT 23. Therefore, the scanning line SCN is also referred to as a gate line.

As shown in FIG. 5, the retentive capacitance Cx is connected to the equivalent capacitance C6 in parallel. The retentive capacitance Cx is provided to prevent a write potential from decreasing by the leakage current from the TFT 23 due to shortage of the storage capacity in the equivalent capacitance C6. In addition, addition of the retentive capacitance Cx contributes to preventing flickers and improving uniformity of the screen luminance.

FIG. 6 shows an arrangement of the pixel electrodes 22.

As shown in FIG. 6, plural gate lines (scanning lines SCN, refer to FIG. 5) arranged in a parallel stripe shape in a row direction (x direction) intersect with the plural signal lines SIG arranged in a parallel stripe shape in a column direction (y direction). The rectangular area surrounded by two arbitrary scanning lines SCN and two arbitrary signal lines SIG defines the (sub-)pixel PIX. The pixel electrode 22 is formed in a rectangular isolation pattern slightly smaller than each pixel PIX. In this manner, the plural pixel electrodes 22 are arranged in a matrix shape in a planar shape.

The liquid crystal display device 1 in which such pixels are arranged is provided with a substrate (hereinafter, referred to as a driving substrate 2) which has the TFT 23 shown in FIG. 5 in the area not shown in the cross section as seen from the cross-sectional structure (structure of z direction) in FIG. 4D and is supplied with a driving signal (signal voltage) of the pixel, a counter substrate 4 which is arranged to face the driving substrate 2 and the liquid crystal layer 6 which is arranged between the driving substrate 2 and the counter substrate 4.

The liquid crystal display device 1 in the example is provided with the pixel electrode 22 and the counter electrode 43 which face each other with the liquid crystal layer 6 being interposed therebetween for driving the liquid crystal display and the detection electrode 44 and the driving electrode (=counter electrode) 43 for driving the touch sensor.

In FIG. 4D, in order to make it easy to see the cross-sectional structure, while the counter electrode (driving electrode) 43, the pixel electrode 22, and the detection electrode 44 are hatched, other portions (such as a substrate, an insulation film, and a functional film) are not hatched.

As a section to realize a display function, a display unit in Claim is formed with the driving substrate 2, the liquid crystal layer 6, the counter electrode 43 and the color filter 42.

In addition, as a section to realize a touch sensor function, a proximity operation detecting unit in Claim is formed with the counter substrate 4 (the driving electrode 43, the detection electrode 44, and the like), a detecting unit 8, and a detection driving scanning unit 9.

The driving substrate 2 has a TFT substrate 21 as a circuit substrate on which the TFT 23 of FIG. 5 is formed and the plural pixel electrodes 22 which are arranged on this TFT substrate 21 in a matrix shape.

A substrate body of the TFT substrate 21 is made of glass and the like. A display driver (not shown) (signal line driving circuit, scanning line driving circuit and the like) for driving each pixel electrode 22 is formed on the TFT substrate 21. In addition, the TFT 23 of FIG. 5 and wiring lines such as the signal line SIG and the scanning line SCN are formed on the TFT substrate 21. A detection circuit for touch detection operation may be formed on the TFT substrate 21.

The counter substrate 4 has a glass substrate 41, the color filter 42 formed on one surface of the glass substrate 41, and the counter electrode 43 formed on the color filter 42 (the liquid crystal layer 6 side).

The color filter 42 is configured by periodically arranging three color filter layers having, for example, red (R), green (G), and blue (B) colors, and each pixel PIX (pixel electrode 22) corresponds to one of the three colors of R, G, and B. While a pixel corresponding to one color is referred to as a sub-pixel, and three sub-pixels having three colors of R, G, and B are referred to as a pixel in some cases, the sub-pixel is also represented as a pixel PIX herein.

Moreover, a white pixel (W) is provided in some cases as well as R, G, B, to be in a state where the color filters corresponding to four colors are arranged in the color filter 42 in this case.

The counter electrode 43 is also used as a sensor driving electrode configuring a part of the touch sensor for performing the touch detection operation and the counter electrode 43 corresponds to the driving electrode E1 of FIGS. 1A to 2B.

The counter electrode (driving electrode) 43 is connected to the TFT substrate 21 by a contact conductive pillar 7. The common driving signal Vcom having an AC pulse waveform is applied from the TFT substrate 21 to the counter electrode 43 through the contact conductive pillar 7. The common driving signal Vcom corresponds to the AC pulse signal Sg supplied from a driving signal source S of FIGS. 1A to 2B.

The detection electrode 44 is formed on the other surface (display surface side) of the glass substrate 41 and a protection layer 45 is formed on the detection electrode 44.

The detection electrode 44 configures a part of the touch sensor and corresponds to the detection electrode E2 in FIGS. 1A to 2B. A detection circuit to perform the touch detection operation, which will be described later, may be formed on the glass substrate 41.

The liquid crystal layer 6 is a display function layer and modulates the light passing through the layer in a thickness direction (a direction facing the electrode) according to the state of the applied electric field. The liquid crystal layer 6 may be formed using various modes of liquid crystal materials such as TN (twisted nematic), VA (vertical alignment), and ECB (electrically controlled birefringence).

An alignment film is respectively provided between the liquid crystal layer 6 and the driving substrate 2 and between the liquid crystal layer 6 and the counter substrate 4. In addition, a polarization plate is respectively provided on the anti-display surface side (that is, back surface side) of the driving substrate 2 and the display surface side of the counter substrate 4. Such an optical function layer is omitted from FIGS. 4A to 4D.

The driving electrode 43 and the detection electrode 44 are divided in a direction intersecting with each other as shown in FIGS. 4A to 4C.

FIG. 4A shows an arrangement state of the driving electrode 43, FIG. 4B shows an arrangement state of the detection electrode 44 and FIG. 4C shows a combination thereof.

As shown in FIG. 4A, the driving electrode 43 is divided in a row or column direction of the pixel arrangement, for example, in a column direction in this example (y direction of the drawing). The division direction corresponds to a scanning direction of the pixel lines in the display driving, that is, a direction for sequentially activating the scanning lines SCN by the scanning line driving circuit (not shown).

For the divided driving electrode 43, a predetermined number n of driving electrodes 43_1, 43_2, . . . , 43_$m$, . . . , 43_$n$ are arranged. Here, "m" is an integer which is equal to or larger than 2 and smaller than "n".

The driving electrodes 43_1 to 43_$n$ are arranged in a band shape having a relatively small width and extending in the row direction (x direction) and spaced from one another in parallel. Here, the width of the driving electrode 43 (size in the y direction) can be defined, irrespective of the pixel size of the liquid crystal display device, as a touch sensor added to the liquid crystal display device. The smaller the width of the driving electrode 43 is, the higher the detection accuracy or the resolution of object detection is.

The n-divided driving electrodes 43_1 to 43_$n$ are driven at the same time in units of m ($2 \leq m < n$).

A set of simultaneously driven driving electrodes 43 is represented as an AC driving electrode unit EU. In the embodiment, the number of driving electrodes included in one AC driving electrode unit EU is a fixed number m. Furthermore, while the combination of the driving electrodes is partially overlapped and changed, the AC driving electrode unit EU is shifted stepwise in a column direction.

A direction of the shift is the y direction of FIGS. 4A to 4C and is referred to as a scanning direction. In addition, an operation in which a combination of the driving electrodes selected as a set of continuous driving electrodes is shifted on one direction is referred to as scanning.

A combination of the counter electrodes selected as the AC driving electrode unit EU for each shift is shifted in the scanning.

At this time, in the continuous two selections performed before and after the shift is performed once, one or more driving electrodes are overlapped and selected. When a shift amount is represented by the number of driving electrodes, a range of the shift amount corresponds to the number of driving electrodes of equal to or larger than 1 and equal to or smaller than (m−1).

The operation of AC driving with such an AC driving electrode unit EU of the driving electrodes set as a unit and the shift operation for the AC driving electrode unit EU are performed by the detection driving scanning unit 9.

The shift amount is desirably a minimum amount equivalent to one driving electrode since the detection accuracy and the resolution of an object to be detected can be set to the highest. This desirable minimum shift amount is a premise of the description below. Under this premise, the operation of the detection driving scanning unit 9 can be considered to be the same as "the operation of scanning in the column direction while changing one by one the driving electrodes 43 selected by moving the driving signal source S which simultaneously AC-drives the m driving electrodes 43 in the column direction (refer to FIGS. 1A to 2B)." An arrow drawn from the driving signal source S in FIGS. 4A and 4C schematically indicates the scanning of the signal source.

On the other hand, the detection electrode 44 as shown in FIG. 4B is formed by conductive films divided into a predetermined number k in the x direction and arranged in a parallel stripe shape long in the y direction which is orthogonal to the driving electrode 43. The respective detection electrodes are denoted by 44_1 to 44_k.

The detecting unit 8 is connected to one ends of the k detection electrodes 44_1 to 44_k arranged as described above. A basic detection unit of the detecting unit 8 is the voltage detector DET as a "detection circuit" shown in FIGS. 1A to 2B.

The respective k detection electrodes 44_1 to 44_k are connected to the voltage detector DET corresponding to the detecting unit 8. Therefore, the voltage detector DET can detect the detection signal Vdet (refer to FIGS. 3A to 3C) from each detection line.

The arrangement pattern of the driving electrode 43 and the detection electrode 44 shown in FIGS. 4A to 4C above are redundantly arranged on the display image surface formed with the pixels PIX arranged in a matrix shape as shown in FIG. 6.

The driving electrode 43 and the detection electrode 44 or the pixel electrode 22 is respectively a transparent electrode and made of, for example, ITO, IZO or an organic conductive film.

3. DETECTION ELECTRODE OF FIRST EMBODIMENT

A conductive film pattern of the detection electrode 44 in the liquid crystal display device 1 with the above configuration as the first embodiment will be described.

Figure 7A:
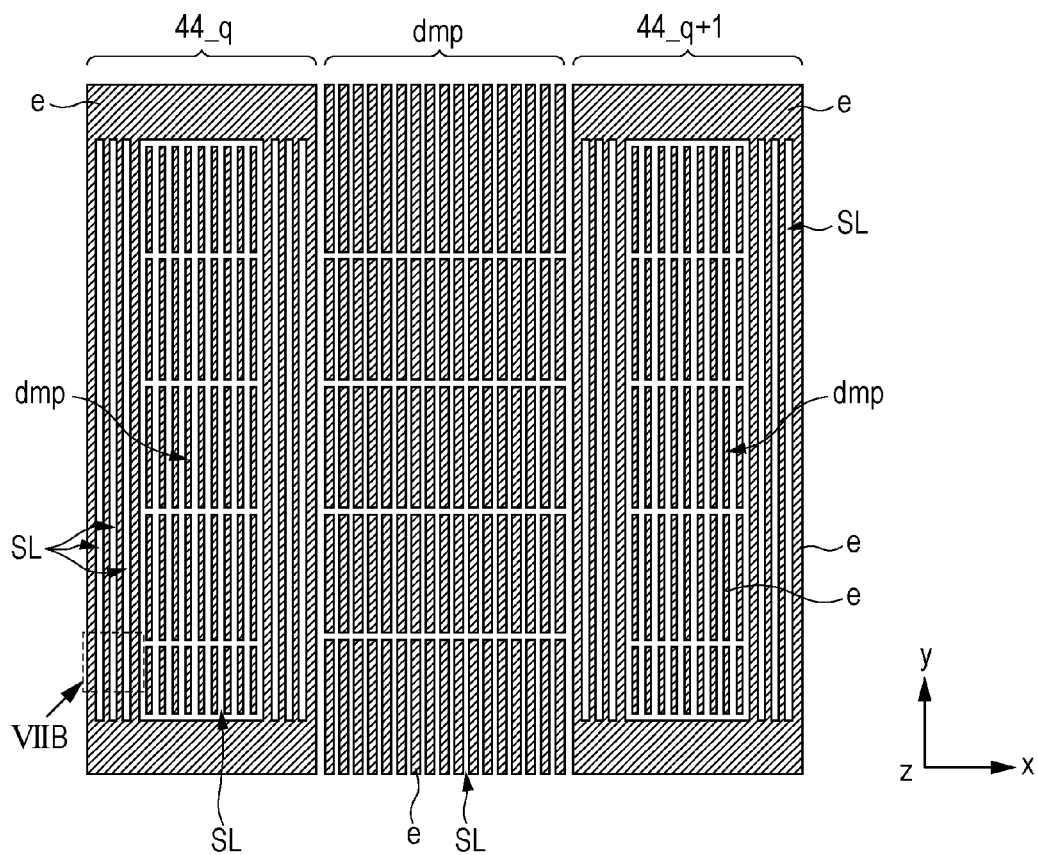
FIGS. 7A to 7C are illustration diagrams of a conductive film pattern of a detection electrode according to a first embodiment.

First, FIG. 7A shows an example of the conductive film pattern of the detection electrode 44. Here, certain two detection electrodes 44_q and 44_q+1 of the detection electrodes 44_1 to 44_k shown in FIGS. 4A to 4D are shown. For convenience of the drawing, an electrode width direction of the detection electrodes 44_q and 44_q+1 is enlarged and a longitudinal direction thereof is reduced.

In FIG. 7A, a hatched portion is a portion where the conductive film e is formed and a non-hatched portion is a portion where the conductive film e is not formed (hereinafter, referred to as slits SL).

As shown in the drawing, as a conductive film pattern forming the detection electrode 44, there are an electrode pattern portion (that is, a portion which is the detection electrodes 44_q and 44_q+1) which is electrically connected to the above-described detecting unit 8 to practically function as an electrode and a dummy pattern portion dmp which does not function as an electrode and in which the conductive film e is formed.

Figure 7B:
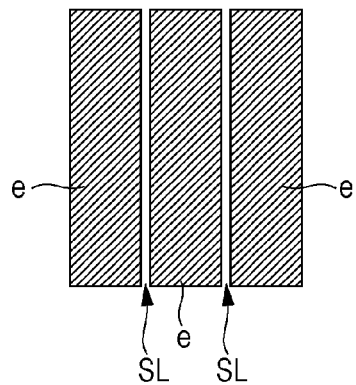
Figure 7C:
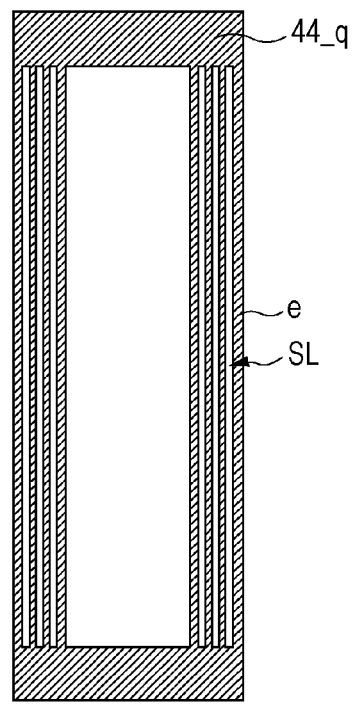

In FIG. 7C, a portion which is one detection electrode 44_q is extracted to be shown. As shown in the drawing, the one detection electrode 44_q is formed as the square-shaped conductive film. The respective detection electrodes 44_1 to 44_k are formed as the respective square-shaped conductive film and the ends of the respective detection electrodes are connected to the voltage detector DET corresponding to the above-described detecting unit 8.

The detection electrode 44_q has the conductive film pattern in which the necessary number of slits SL are formed on both side of the square-shaped pattern, that is, in portions actually extending in the y direction as shown in FIG. 4B. FIG. 7B shows a portion where the slit SL is formed in a part of the square-shaped conductive film pattern in an enlarged manner.

In addition, the slit SL is also formed in the dummy pattern portion dmp provided inside of the square shape and between adjacent square-shaped patterns.

The reasons that the dummy pattern portion dmp is provided and the slit SL is provided in the pattern of the conductive film e which is the detection electrodes 44_1 to 44_k and the dummy pattern portion dmp are as below.

First, the detection electrode 44 is formed as a transparent electrode. However, the detection electrode is not completely transparent. In order to increase transmittance of light which is a display image, it is attempted to provide a portion where the conductive film e is not present.

On the other hand, it is not preferable to increase a resistance value of the square-shaped pattern portion from the viewpoint of touch detection sensitivity. That is, it is further recommended to avoid blindly providing a portion where the conductive film e is not present in the square-shaped pattern portion from the viewpoint of touch detection sensitivity.

In terms of taking the above problems into consideration, while the linear conductive film e is formed in the square-shaped pattern portion not to increase the resistance value as much as possible, a non-conductive portion may be formed. Then, as shown in FIG. 7C, the square-shaped pattern portion forms the slit SL without the conductive film e to increase the light transmittance and the linear pattern of the conductive film e is secured to maintain a low resistance value as an electrode.

Furthermore, when only the square-shaped pattern portion shown in FIG. 7C is formed, it is disadvantageous from the viewpoint of inconspicuousness of the detection electrodes 44_1 to 44_k.

In other words, the differences between the detection electrodes 44_1 to 44_k where the conductive films e are formed and a non-conductive film between each detection electrode are easily visualized and inconspicuousness of the electrodes is not maintained.

The dummy pattern portions dmp are formed inside of the square-shaped pattern and in intervals of the detection electrodes 44_1 to 44_k. The slits SL are formed in the dummy pattern portion dmp as in the square-shaped pattern to improve inconspicuousness with respect to the conductive film e (the whole forming surfaces of the detection electrodes 44_1 to 44_k) as a whole.

It is possible to maintain or improve the detection properties and inconspicuousness with the conductive film pattern of the detection electrodes 44_1 to 44_k as shown in FIGS. 7A to 7C. However, moiré reduction is realized in the embodiment.

Figure 8A:
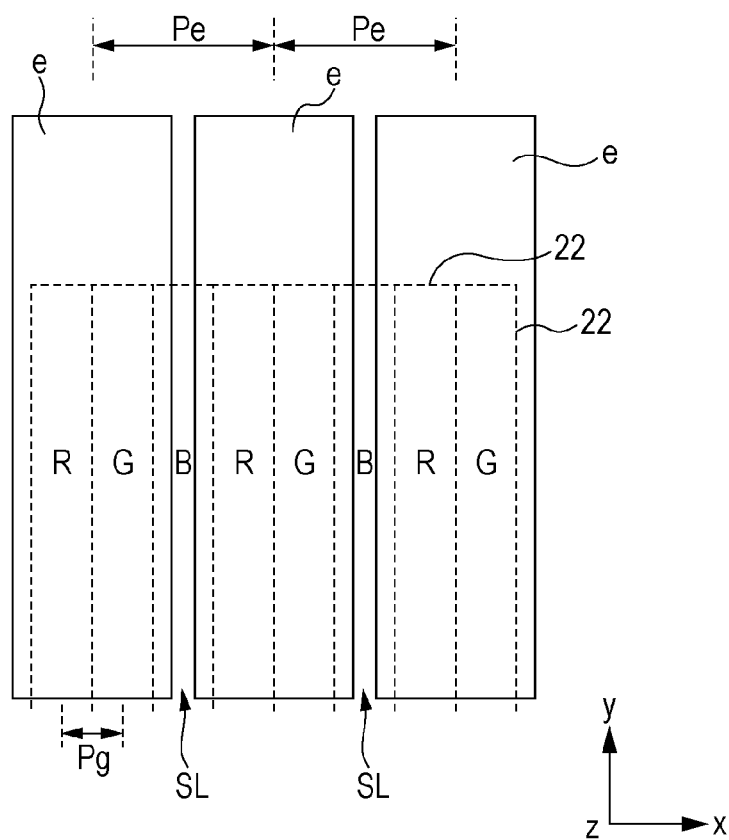
FIGS. 8A and 8B are illustration diagrams of a linear pattern pitch of the conductive film in the detection electrode according to the first embodiment.
Figure 8B:
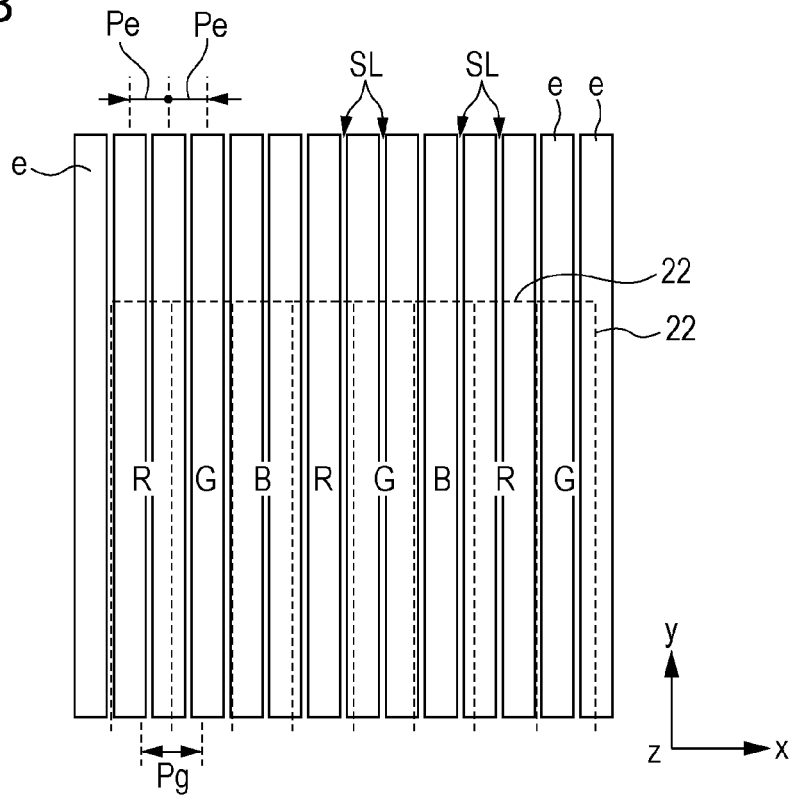

FIGS. 8A and 8B schematically show an arrangement position relationship between the conductive film e and the pixel electrode 22.

The conductive film e in the drawing corresponds to any of the detection electrodes 44_q and 44_q+1 (square-shaped pattern portion) in FIG. 7A, and the dummy pattern portion dmp. That is, a part of a region in which the linear conductive film e divided by the slit SL is formed is shown.

Moreover, with respect to the pixel electrodes 22, the arrangement state of each sub-pixel of R, G and B is indicated by broken lines with R, G and B.

FIG. 8A shows a case where a pitch Pe in the linear pattern of the conductive film e divided by the slit SL is larger than an arrangement pitch Pg in one direction (x direction) of the pixel electrode 22.

For example, the pitches Pe of the linear pattern are separated from each other with a pitch of a natural number times as large as the arrangement pitch Pg of the pixel electrode 22 (three times in the drawing).

In this case, the linear pattern of the conductive film e forming the driving electrode 43 (or the dummy pattern portion dmp) and a pixel pattern interfere with each other to be shown as moiré fringes which are visible to a human eye in some cases.

In the embodiment, as shown in FIG. 8B, the pitch Pe in the linear pattern of the conductive film e by divided the slit SL is equal to or smaller than the pitch Pg in one direction (x direction) of the pixel electrode 22.

The pitch Pe of the linear pattern in the conductive film e forming the driving electrode 43 (or the dummy pattern portion dmp) is narrowed so as to be equal to or smaller than the pitch Pg of the sub-pixel and then, the moiré fringes can be barely visible.

In this case, not only the pitch Pe of the linear pattern is narrowed to be equal to or smaller than the pitch Pg of the sub-pixel but also the pitch of the linear pattern does not have a value obtained by dividing the pitch Pg of the sub-pixel by a natural number such as 1/1, 1/2, 1/3 . . . , which is preferable from the viewpoint of moiré reduction.

In other words, it is effective to reduce visibility of the pattern of the conductive film e to a human by narrowing the linear pattern pitch of the conductive film e and to disperse interference by weakening the regularity with the pixel electrode pattern in the moiré fringe reduction.

When the pixels PIX with four colors of R, G, B and W are provided, luminance contrast becomes strong by the influence of the white pixel the moiré fringes are emphasized more than the case of using three colors of R, G and B.

The embodiment can be suitably applied even to a case of using the pixels of four colors of R, G, B and W.

Figure 9A:
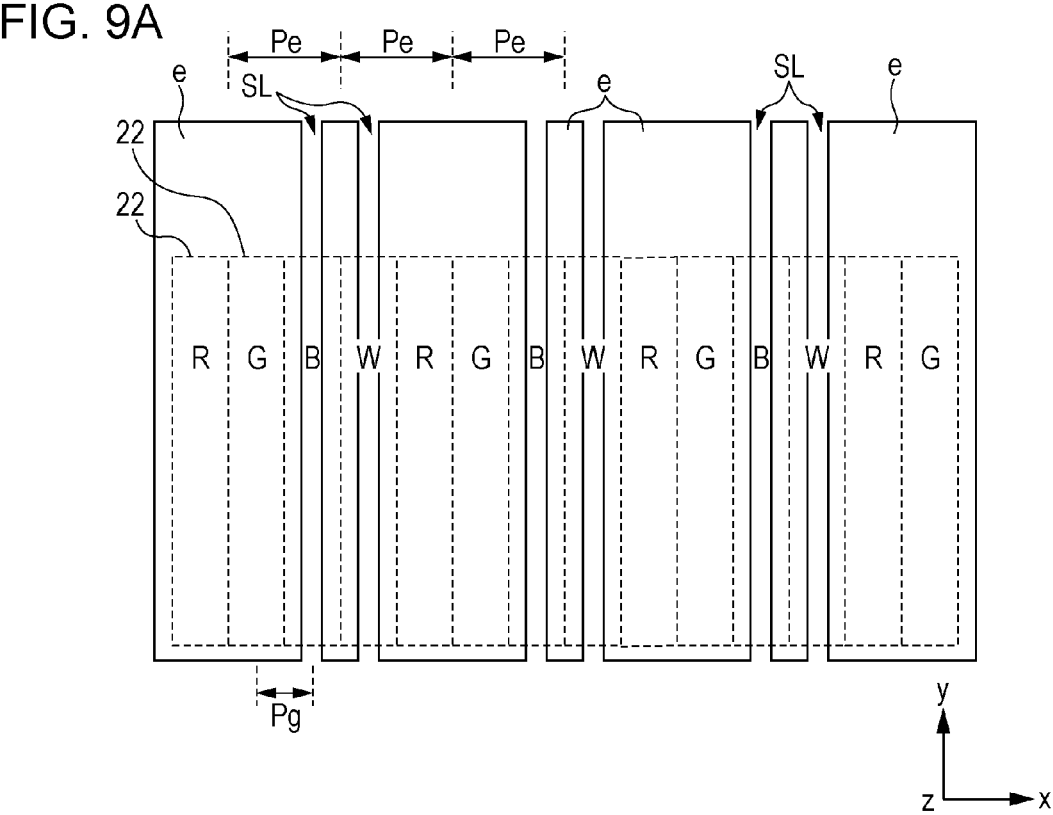
FIGS. 9A and 9B are illustration diagrams of the linear pattern pitch of the conductive film in the detection electrode according to the first embodiment.
Figure 9B:
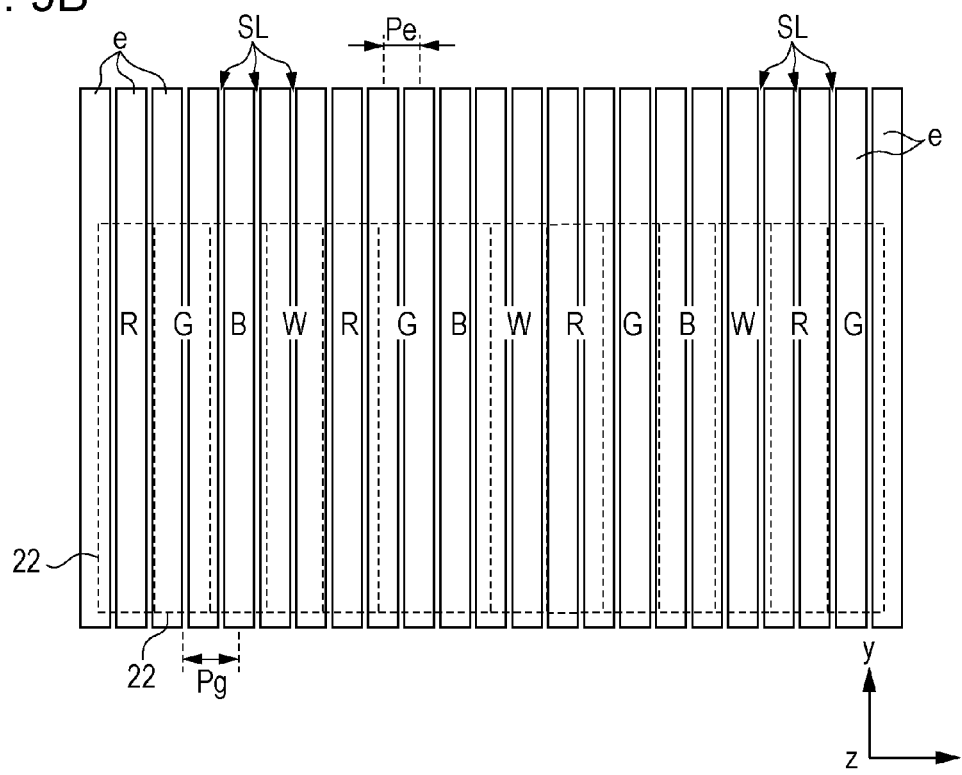

FIGS. 9A and 9B schematically show the conductive film e in relation to the pixel electrode 22 as shown in FIGS. 8A and 8B.

Furthermore, an arrangement state of each sub-pixel of R, G, B and W as the pixel electrode 22 is indicated by broken lines with R, G, B and W.

FIG. 9A shows a case where the pitch Pe in the linear pattern of the conductive film e divided by the slit SL is larger than the pitch Pg in one direction (x direction) of the pixel electrode 22.

Then, for example, the pitches Pe of the linear pattern are separated from each other with a pitch of a natural number times as large as the pitch Pg of the pixel electrode 22 (three times in the drawing) so that the slits SL are positioned in the B pixel and W pixel.

In this case, the moiré fringes are conspicuous.

As the embodiment, as shown in FIG. 9B, the pitch Pe in the linear pattern of the conductive film e divided by the slit SL is equal to or smaller than the pitch Pg in one direction (x direction) of the pixel electrodes 22.

The pitch Pe of the linear pattern preferably does not have a value obtained by dividing the pitch Pg of the sub-pixel by a natural number.

In this manner, the moiré fringes can be not conspicuous even in the configuration having the pixels of four colors.

4. DETECTION ELECTRODE OF SECOND EMBODIMENT

The conductive film pattern in the detection electrodes 44_1 to 44_k as a second embodiment will be described using FIG. 10.

Figure 10:
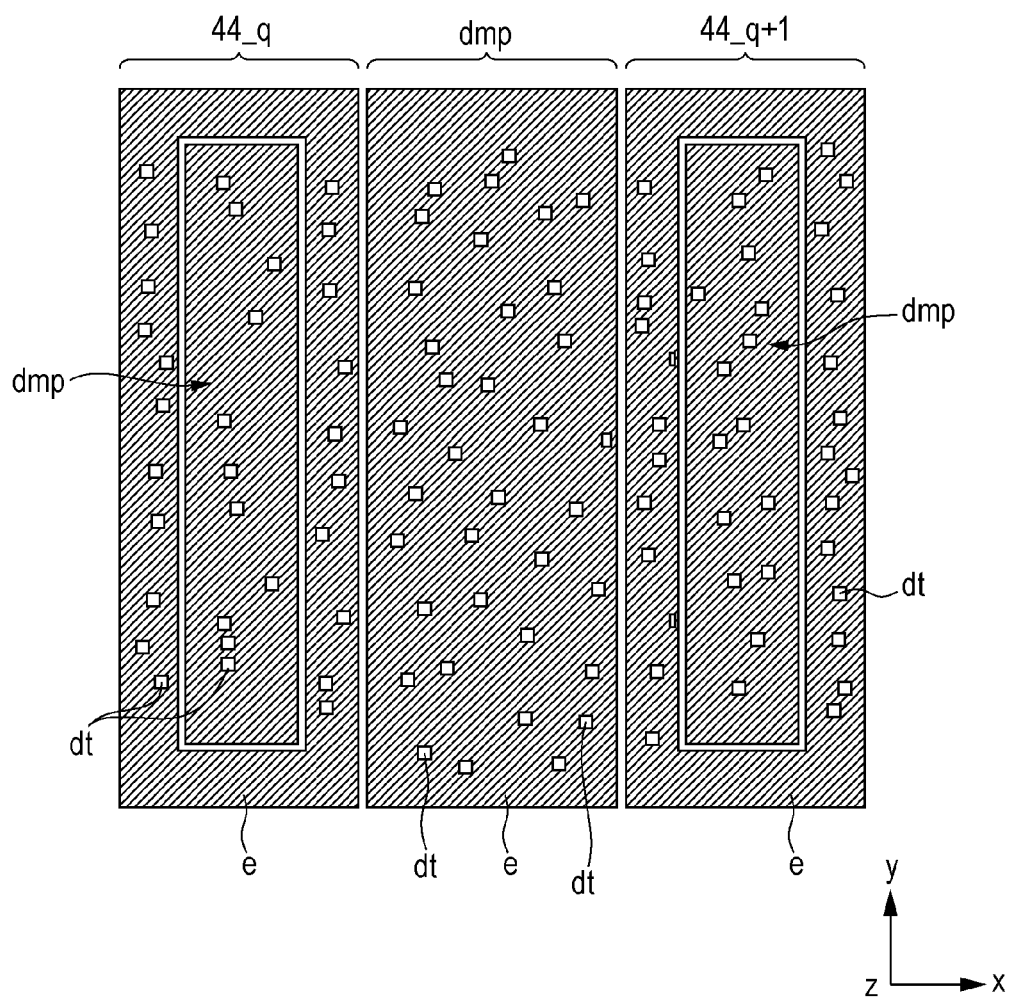
FIG. 10 is an illustration diagram of a conductive film pattern of a detection electrode according to a second embodiment.

FIG. 10 shows a pattern of the conductive film e in the certain detection electrodes 44_q and 44_q+1 of the detection electrodes 44_1 to 44_k as in FIG. 7A above.

The detection electrodes 44_q and 44_q+1 are patterned in a square shape and the dummy pattern portion dmp is formed, which is the same as in the first embodiment.

In the second embodiment, a spot-like non-conductive portion dt is formed on the conductive film e instead of the above-described slit SL.

In the example of the drawing, the spot-like non-conductive portion dt is randomly formed on the conductive film e.

In the second embodiment, the spot-like non-conductive portion dt is randomly arranged so that the conductive film pattern as the detection electrodes 44_1 to 44_k (and the dummy pattern portion dmp) is not likely to be interfered with by the pixel electrode pitch (to reduce locations to interfere). Due to this, moiré fringe reduction is realized.

Moreover, the area of the conductive film e of the square-shaped pattern as the detection electrodes 44_1 to 44_k is increased and the resistance value is decreased to improve sensor detection properties more than in the first embodiment.

In addition, the dummy pattern portion dmp is provided inside of the square-shaped pattern and between adjacent detection electrodes 44 to randomly provide the spot-like non-conductive portion dt in the dummy pattern portion dmp as in the square-shaped pattern as the detection electrodes 44_1 to 44_k. For this reason, inconspicuousness of the detection electrodes 44_1 to 44_k is maintained or improved.

Then, the area of the spot-like non-conductive portion dt, is desirably equal to or larger than 0.0025 times a display area of the sub-pixel to obtain moiré reduction effect.

Furthermore, while it is suitable that the spot-like non-conductive portion dt is randomly arranged, the spot-like non-conductive portion dt may not be necessarily randomly arranged. It is sufficient to have an arrangement pattern which is not likely to be interfered with the pixel electrode pattern even when there is regularity.

The shape of the spot-like non-conductive portion dt is not limited to a square shape as shown in the drawing, and various shapes such as a circular shape, an elliptical shape, a rectangular shape, a triangular shape, a polygonal shape or an undefined shape may be considered.

5. DETECTION ELECTRODE OF THIRD EMBODIMENT

The conductive film pattern of the detection electrodes 44_1 to 44_k as a third embodiment will be described with reference to FIGS. 11A to 12B. The conductive film pattern is shown as an example of a pattern of a continuous bending line.

Figure 11A:
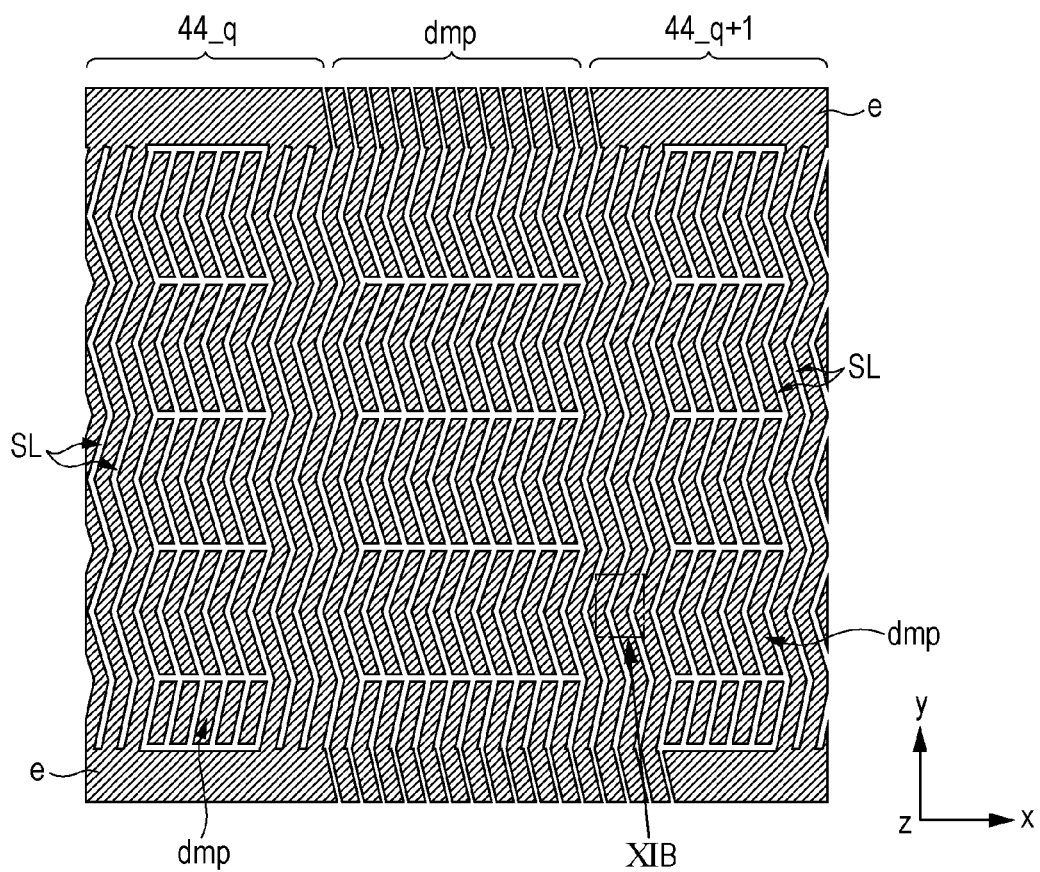
FIGS. 11A to 11C are illustration diagrams of a conductive film pattern of a detection electrode according to a third embodiment.

FIG. 11A shows the pattern of the conductive film e in the certain detection electrodes 44_q and 44_q+1 of the detection electrodes 44_1 to 44_k as in FIG. 7A above.

The detection electrodes 44_q and 44_q+1 have a square-shaped pattern and the dummy pattern portion dmp is formed as in the above embodiments.

In the third embodiment, a bending linear slit SL is formed on the conductive film e and the conductive film e has a bending linear pattern by the bending linear slit.

Since the conductive film e has a bending linear shape, the interference with the pixel electrode pattern is reduced and reduction of moiré is realized.

Then, a resistance value is retained to be low by maintaining the conductive film e in the square-shaped pattern as the detection electrodes 44_1 to 44_k in an almost straight line shape so that sensor detection properties are maintained.

Further, the dummy pattern portion dmp is provided inside of the square-shaped pattern and an interval portion of the detection electrodes and the bending linear slit SL is also formed in the dummy pattern portion dmp as in the square-shaped pattern as the detection electrodes 44_1 to 44_k. Then, the conductive film e has the bending linear pattern so that inconspicuousness of the detection electrodes 44_1 to 44_k is facilitated.

Figure 12A:
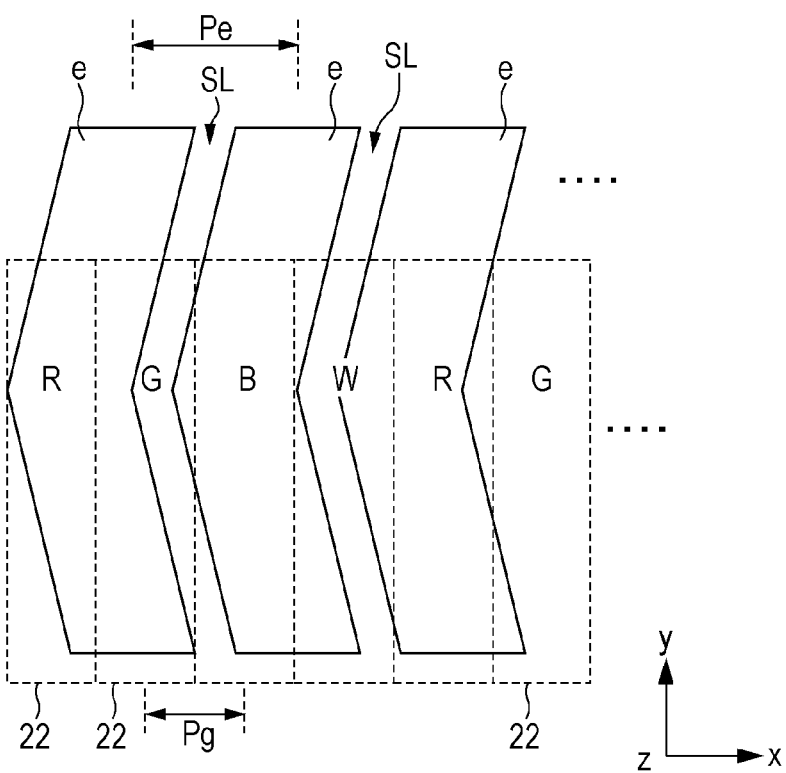
FIGS. 12A and 12B are illustration diagrams of a bending line pattern pitch of the conductive film in the detection electrode according to the third embodiment.
Figure 12B:
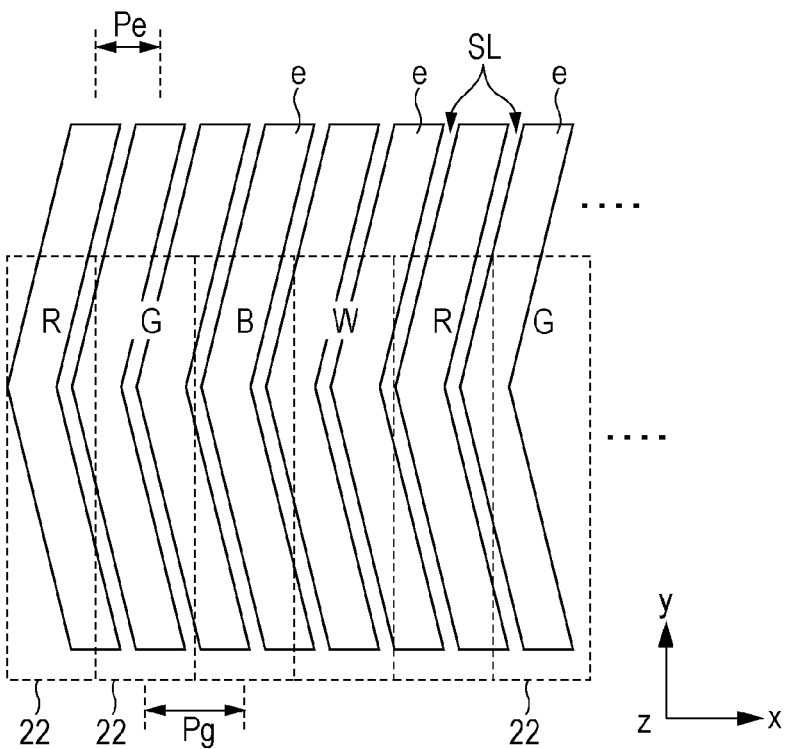

Here, the bending linear pitch Pe of the conductive film e can be considered in any of examples in FIGS. 12A and 12B.

FIGS. 12A and 12B schematically show the conductive film e in relation to the pixel electrode 22 as in FIGS. 9A and 9B. For the pixel electrode 22, an arrangement state of each sub-pixel of R, G, B and W is indicated by broken lines with R, G, B and W.

FIG. 12A shows a case where the pitch Pe in the bending linear pattern of the conductive film e divided by the slit SL is larger than the arrangement pitch Pg in one direction (x direction) of the pixel electrode 22.

In the first embodiment above, when the pitch Pe in the linear pattern of the conductive film e is larger than the pitch Pg of the pixel, moiré fringes are conspicuous. However, in the third embodiment, since the conductive film e has a bending linear pattern, interference with the pattern of the pixel electrode 22 is suppressed. Therefore, even when it is Pe>Pg, it is possible to obtain moiré reduction effect.

On the other hand, FIG. 12B is an example in which the Pitch Pe of the bending linear pattern of the conductive film e divided by the slit SL is equal to or smaller than the arrangement pitch Pg in one direction (x direction) of the pixel electrode 22.

It is preferable that the pitch Pe of the bending linear pattern do not have a value obtained by dividing the pitch Pg of the sub-pixel by a natural number.

In this manner, that moiré reduction effect can be further increased by narrowing the pitch Pe of the bending linear pattern to be equal to or smaller than the pitch Pg and weakening regularity with the sub-pixel pattern.

Figure 11B:
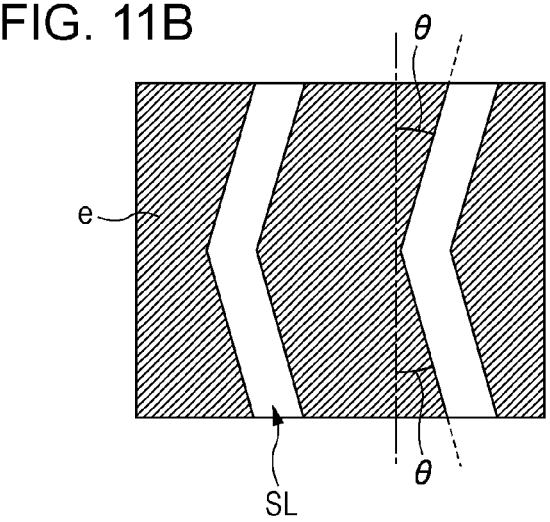

Then, FIG. 11B shows a part of the bending linear pattern of the conductive film e in an enlarged manner. However, there is an appropriate angle range for an angle θ forming a bending line.

First, with respect to moiré fringe reduction effect, a range of 5°>θ>85° is suitable since interference with the pattern of the pixel electrode 22 is easily avoided.

In addition, the conductive film pattern may have an almost straight line shape from the viewpoint of sensor detection properties. Therefore, a range of 0°>θ>45° is suitable.

Finally, it is suitable to be 5°>θ>45° for an angle range included in two angle ranges or more.

For example, it is desirable to be θ=15°.

In addition, it is desirable that a repetition of the bending linear pattern in the y direction be arranged for each pixel so as to form a bending line in a region corresponding to one pixel from the viewpoint of moiré reduction effect, that is, from the meaning of reduction in interference with the pattern of the pixel electrode 22.

Figure 11C:
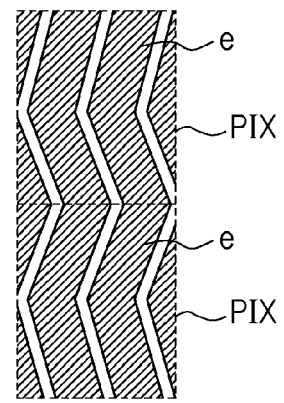

For example, FIG. 11C shows a range of the pixels PIX arranged in the y direction indicated by broken lines. However, one bending linear pattern is formed in a range corresponding to one pixel PIX as shown in the drawing.

6. DETECTION ELECTRODE OF FOURTH EMBODIMENT

The conductive film pattern of the detection electrodes 44_1 to 44_k as a fourth embodiment will be described with reference to FIGS. 13 to 14B. The embodiment is an example of the conductive film pattern having a pattern of a continuous wavy line.

Figure 13:
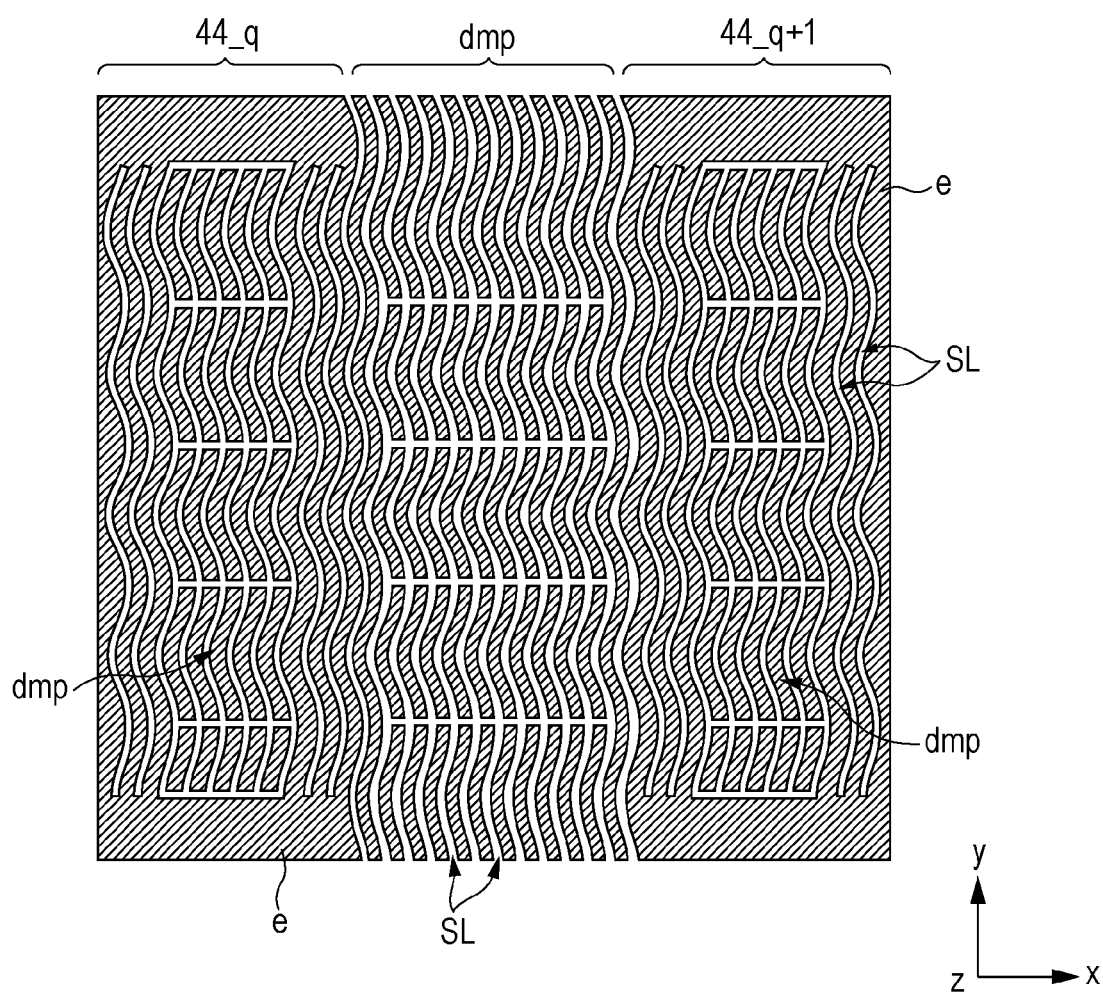
FIG. 13 is an illustration diagram of a conductive film pattern of a detection electrode according to a fourth embodiment.

FIG. 13 shows a pattern of the conductive film e in the certain detection electrodes 44_q, 44_q+1 of the detection electrodes 44_1 to 44_k as in FIG. 7A above.

The detection electrodes 44_q and 44_q+1 have a square-shaped pattern and the dummy pattern portion dmp is formed in the same manner.

In the fourth embodiment, a wavy slit SL is formed on the conductive film e so that the conductive film e has a wavy line (serpentine linear) pattern by the wavy slit.

The conductive film e has a wavy line shape and particularly a corner portion is removed so that interference with the pixel electrode pattern is reduced to realize moiré reduction.

Then, since the conductive film e of the square-shaped pattern for the detection electrodes 44_1 to 44_k is maintained in an almost straight line state, a resistance value is retained to be low and sensor detection properties are maintained.

Further, the dummy pattern portion dmp is provided inside of the square-shaped pattern or an interval portion of the detection electrodes and the wavy slit SL is also formed in the dummy pattern portion dmp as in the square-shaped pattern for the detection electrodes 44_1 to 44_k. Since the conductive film e has the wavy line pattern, inconspicuousness of the detection electrodes 44_1 to 44_k is facilitated.

Figure 14A:
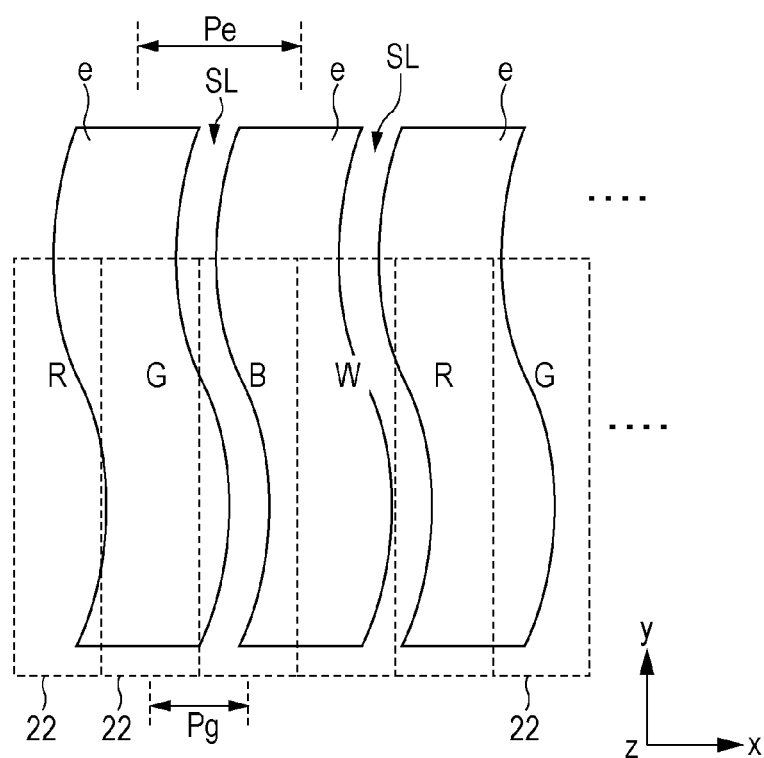
FIGS. 14A and 14B are illustration diagrams of a wavy line pattern pitch of the conductive film in the detection electrode according to the fourth embodiment.
Figure 14B:
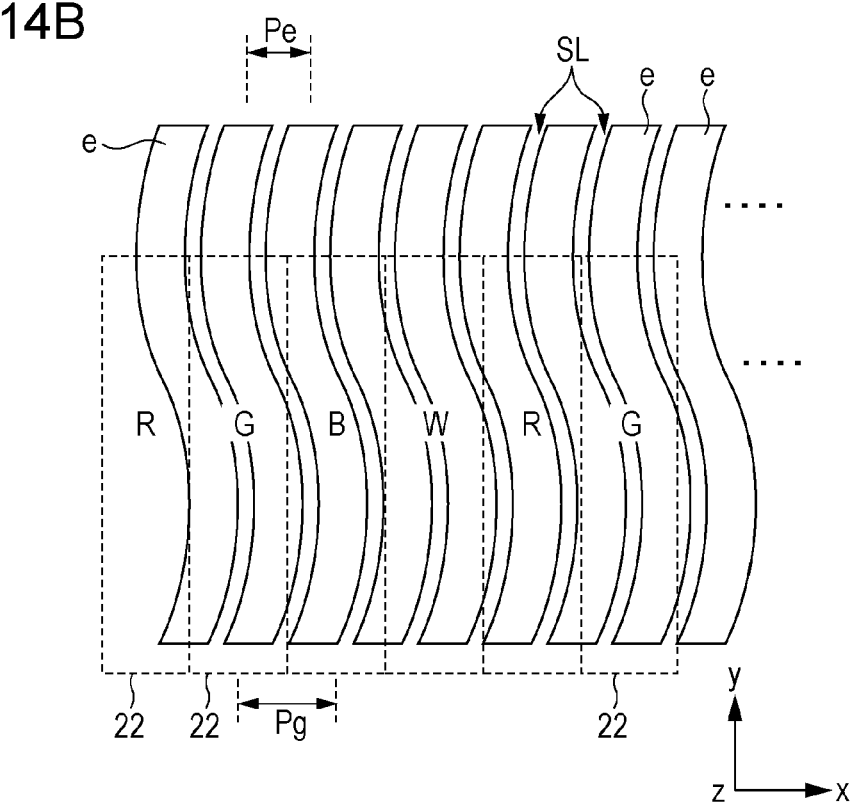

Here, the pitch Pe of the conductive film e having a wavy line shape can be considered in any example of FIGS. 14A and 14B.

FIGS. 14A and 14B schematically show the conductive film e in relation to the pixel electrode 22 as in FIGS. 9A and 9B. For the pixel electrode 22, an arrangement state of each sub-pixel of R, G, B and W is indicated by broken lines with R, G, B and W.

FIG. 14A is a case where the pitch Pe of the bending linear pattern of the conductive film e divided by the slit SL is larger than the arrangement pitch Pg in one direction (x direction) of the pixel electrode 22.

In this case, even when the pitch Pe of the linear pattern of the conductive film e is larger than the pitch Pg of the pixel as in the third embodiment, since the conductive film e has the wavy line pattern, interference with the pattern of the pixel electrode 22 is suppressed. Due to this, when it is Pe>Pg, moiré reduction effect can be obtained.

In addition, FIG. 14B is an example in which the pitch Pe of the bending linear pattern of the conductive film e divided by the slit SL is equal to or smaller than the pitch Pg in one direction (x direction) of the pixel electrode 22.

The pitch Pe of the bending linear pattern preferably does not have a value obtained by dividing the pitch Pg of the sub-pixel by a natural number.

In this manner, that moiré reduction effect can be further increased by narrowing the pitch Pe of the bending linear pattern to be equal to or smaller than the pitch Pg and weakening regularity with the sub-pixel pattern.

7. MODIFICATION EXAMPLES AND APPLICATION EXAMPLES

While the embodiment has been described above, the above-described liquid crystal display device is an example of a display device having a proximity detection device. In addition, the configuration of the liquid crystal display device 1 with a touch sensor itself is also an example.

The present disclosure can be applied to various display devices such as a plasma display device or an organic EL display device as a conductive film pattern of a transparent electrode as well as a liquid crystal display device, when a proximity detecting function like a touch sensor is provided.

In the embodiment, while the detection electrode 44 for a touch sensor function is exemplified, the present disclosure also can be applied as the pattern of the driving electrode 43.

Next, the proximity detection device of the present disclosure, for example, application examples of the display device with a touch sensor will be described with reference to FIGS. 15A to 17E. The proximity detection device of the present disclosure can be applied to every field of an electronic apparatus which has a display device displaying a video signal input from the outside or a video signal generated inside as an image or a video such as a portable terminal device like a television device, a digital camera, a notebook type personal computer and a mobile phone or a video camera.

Application Example 1

Figure 15A:
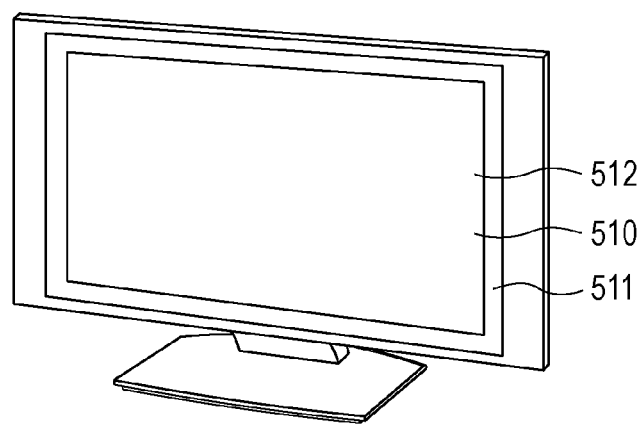
FIGS. 15A to 15C are illustration diagrams of electronic apparatuses according to application examples of the embodiment.

FIG. 15A shows an external appearance of a television device to which the liquid crystal display device 1 with a touch sensor of the embodiment is applied. The television device has, for example, a front panel 511 and a video display screen unit 510 including filter glass 512 and the video display screen unit 510 is configured with the liquid crystal display device 1 according to the embodiment.

Application Example 2

Figure 15B:
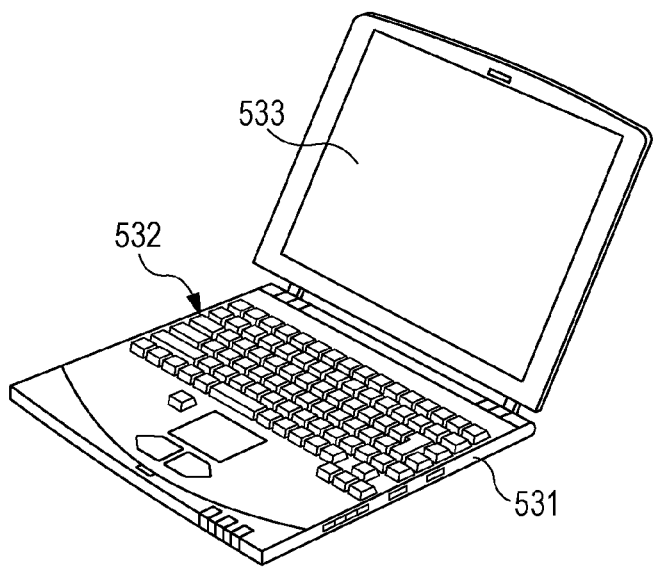

FIG. 15B shows an external appearance of a notebook type personal computer to which the liquid crystal display device 1 of the embodiment is applied. The notebook type personal computer has, for example, a main body 531, a keyboard 532 for an input operation of letters or the like and a display unit 533 to display an image and the display unit 533 is configured with the liquid crystal display device 1 according to the embodiment.

Application Example 3

Figure 15C:
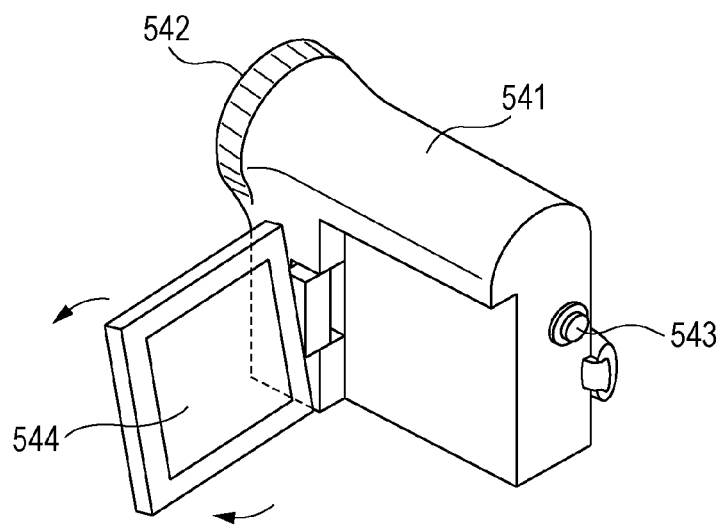

FIG. 15C an external appearance of a video camera to which the liquid crystal display device 1 of the embodiment is applied. The video camera has, for example, a main body unit 541, a lens 542 for imaging an object which is provided in a front side surface of the main body unit 541, a start and stop switch 543 at the time of imaging an object and a display unit 544 and the display unit 544 is configured with the liquid crystal display device 1 according to the embodiment.

Application Example 4

Figure 16A:
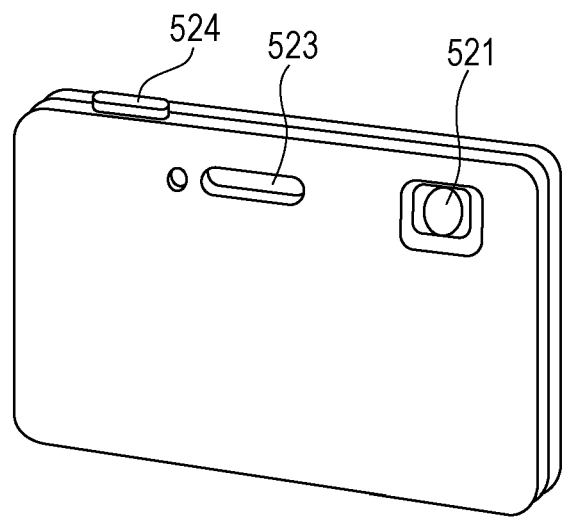
FIGS. 16A and 16B are illustration diagrams of an electronic apparatus according to an application example of the embodiment.
Figure 16B:
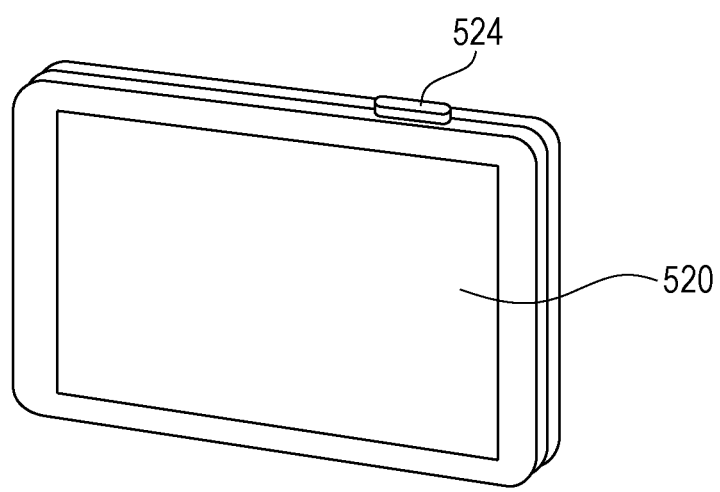
Figure 17A:
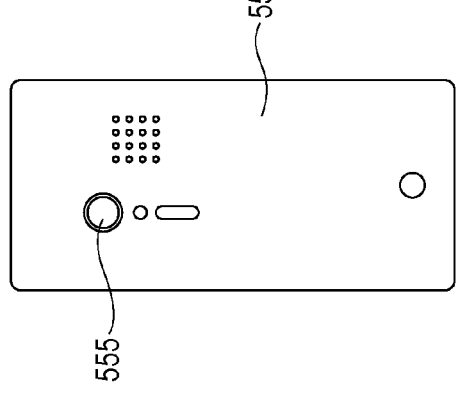
FIGS. 17A to 17E are illustration diagrams of an electronic apparatus according to an application example of the embodiment.
Figure 17B:
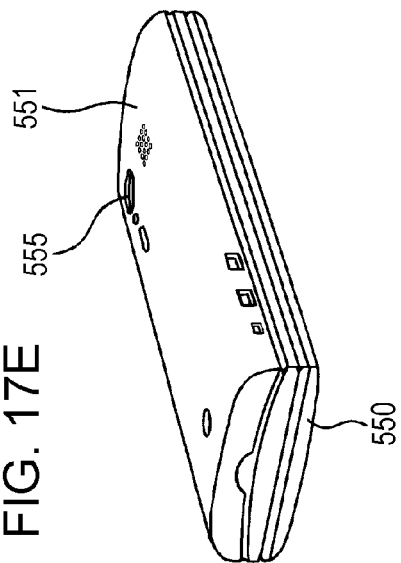

FIGS. 16A and 16B show an external appearance of a digital camera to which the liquid crystal display device 1 of the embodiment is applied. FIG. 17A shows an external appearance of a front surface and FIG. 17B shows an external appearance of a back surface of the digital camera. The digital camera has, for example, a display unit with a touch panel 520, an imaging lens 521, a flash light emitting unit 523 and a shutter button 524 and the display unit 520 is configured with the liquid crystal display device 1 according to the embodiment.

Application Example 5

Figure 17C:
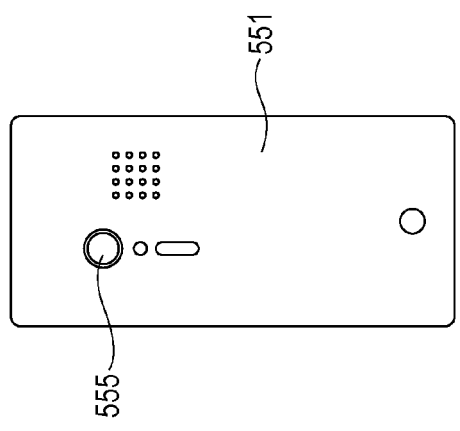
Figure 17D:
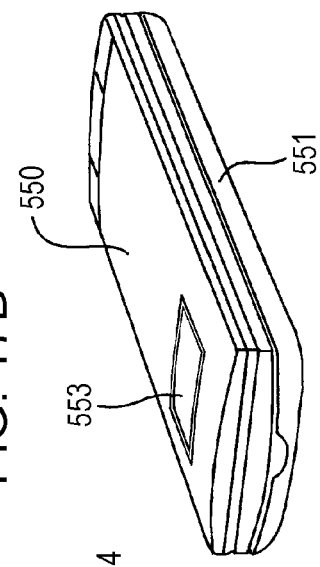
Figure 17E:
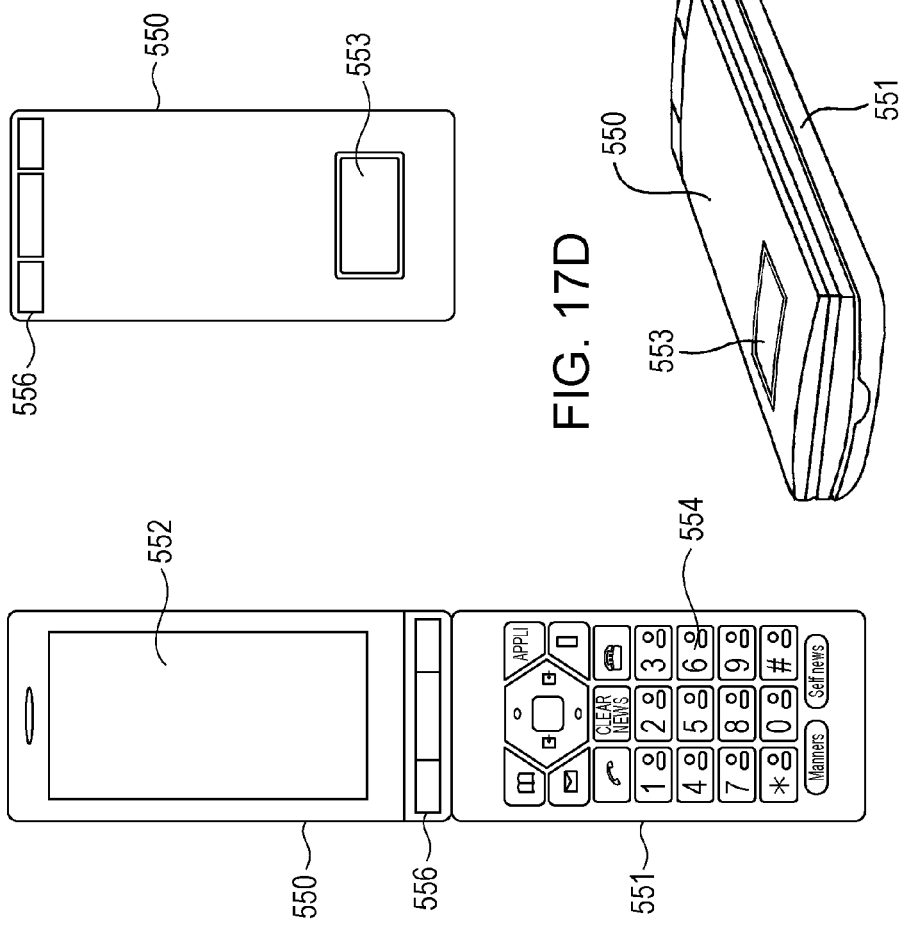

FIGS. 17A to 17E show an external appearance of a mobile phone to which the liquid crystal display device 1 of the embodiment is applied. FIG. 17A shows an operation surface and a display surface of the mobile phone in a state where a case is opened, FIG. 17B shows a top surface in a state where the case is closed and FIG. 17C shows a bottom surface in a state where the case is closed, respectively. FIGS. 17D and 17E are perspective diagrams from the top surface and from the bottom surface in a state where the case is closed.

For example, the mobile phone is formed by connecting an upper case 550 and a lower case 551 by a connection portion (hinge portion) 556 and has a display 552, a sub-display 553, a key operation unit 554 and a camera 555. The display 552 and the sub-display 553 are configured with the liquid crystal display device 1 according to the embodiment.

Then, the present disclosure can employ the following configurations.

(a1) A proximity detection device including a display unit which has a display image surface in which a plurality of pixel electrodes are arranged in a matrix shape and a proximity operation detecting unit in which a transparent electrode for proximity operation detection is arranged to form an operation surface at a position superposed on the display image surface and a conductive film pattern forming the transparent electrode has a pitch of a linear pattern which is equal to or smaller than an arrangement pitch in one direction of the pixel electrodes.

(a2) The proximity detection device according to (a1), wherein the conductive film pattern has an electrode pattern portion which functions as an electrode and a dummy pattern portion which does not function as an electrode, and the pitch of the linear pattern in the conductive film pattern of both of the electrode pattern portion and the dummy pattern portion is equal to or smaller than the arrangement pitch in the one direction of the pixel electrodes.

(b1) A proximity detection device including a display unit which has a display image surface in which a plurality of pixel electrodes are arranged in a matrix shape and a proximity operation detecting unit in which a transparent electrode for proximity operation detection is arranged to form an operation surface at a position superposed on the display image surface and a spot-like non-conductive portion is formed in a conductive film pattern forming the transparent electrode.

(b2) The proximity detection device according to (b1), wherein the spot-like non-conductive portion is randomly arranged in the conductive film pattern forming the transparent electrode.

(b3) The proximity detection device according to (b1) or (b2), wherein the conductive film pattern has an electrode pattern portion which functions as an electrode and a dummy pattern portion which does not function as an electrode and the spot-like non-conductive portion is formed in the conductive film pattern of both of the electrode pattern portion and the dummy pattern portion.

(c1) A proximity detection device including a display unit which has a display image surface in which a plurality of pixel electrodes are arranged in a matrix shape and a proximity operation detecting unit in which a transparent electrode for proximity operation detection is arranged to form an operation surface at a position superposed on the display image surface and a conductive film pattern forming the transparent electrode is a pattern of a continuous bending line or wavy line.

(c2) The proximity detection device according to (c1), wherein the conductive film pattern has a pitch of the bending line or the wavy line which is equal to or smaller than an arrangement pitch in the one direction of the pixel electrodes.

(c3) The proximity detection device according to (c1) or (c2), wherein the conductive film pattern has an electrode pattern portion which functions as an electrode and a dummy pattern portion which does not function as an electrode and the conductive film pattern of both of the electrode pattern portion and the dummy pattern portion is a pattern of the continuous bending line or wavy line.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A proximity detection device comprising:
a display unit which has a display image surface in which a plurality of pixel electrodes are arranged in a matrix shape; and
a proximity operation detecting unit in which a plurality of detection electrodes for proximity operation detection are arranged to form an operation surface at a position superposed on the display image surface,
wherein each of the detection electrodes has a wavy-square pattern including:
a pair of wavy extending portions that extends in a first direction; and
a pair of connector portions that extends in a second direction different from the first direction,
wherein each of the detection electrodes has a wavy dummy pattern portion that is disposed inside the wavy-square pattern and that is surrounded by the pair of wavy extending portions and the pair of connector portions,
wherein each of the wavy extending portions has first wavy slits of wavy lines having a constant waving pattern, and
wherein the wavy dummy pattern portion is divided by second wavy slits of wavy lines having the constant waving pattern.

2. The proximity detection device according to claim 1, wherein
each of the pair of connector portions electrically connecting an end of one of the pair of wavy extending portions to an end of the other one of pair of wavy extending portions.

3. The proximity detection device according to claim 1, wherein
the wavy extending portions are divided by the first wavy slits into wavy stripes which are arranged by a first pitch,
the first pitch is equal to or smaller than an arrangement pitch in the one direction of the pixel electrodes.

4. The proximity detection device according to claim 1, wherein the wavy dummy pattern portion extends in the first direction,
each of the first wavy slits and each of the second wavy slits have a same width in the second direction, and
the wavy extending portions have a same width in the second direction.

5. The proximity detection device according to claim 1, wherein each of the wavy extending portions have a width larger than a width of each of the first wavy slits.

6. The proximity detection device according to claim 2 wherein the wavy dummy pattern portion is further disposed between adjacent wavy extending portions.

7. The proximity detection device according to claim 1, wherein the wavy extending portions and the wavy dummy pattern portions are disposed on a same plane.

8. A method of detecting proximity comprising detecting a proximity operation by using a plurality of detection electrodes in a proximity detection device in which the detection electrodes for proximity operation detection are is arranged to form an operation surface at a position superposed on a display image surface in which a plurality of the pixel electrodes are arranged in a matrix shape,
wherein each of the detection electrodes has a wavy-square shaped pattern including:
a pair of wavy extending portions that extends in a first direction; and
a pair of connector portions that extends in a second direction different from the first direction,
wherein each of the detection electrodes has a wavy dummy pattern portion that is disposed inside the wavy-square pattern and that is surrounded by the pair of wavy extending portions and the pair of connector portions,
wherein each of the wavy extending portions has first wavy slits of wavy lines having a constant waving pattern, and
wherein the wavy dummy pattern portion is divided by second wavy slits of wavy lines having the constant waving pattern.

9. An electronic apparatus including a proximity detection device, the proximity detection device comprising:
a display unit which has a display image surface in which a plurality of pixel electrodes are arranged in a matrix shape; and a proximity operation detecting unit in which a plurality of detection electrodes for proximity operation detection are arranged to form an operation surface at a position superposed on the display image surface, wherein each of the detection electrodes has a wavy-square pattern including:
  a pair of wavy extending portions that extends in a first direction; and
  a pair of connector portions that extends in a second direction different from the first direction, wherein each of the detection electrodes has a wavy dummy pattern portion that is disposed inside the wavy-square pattern and that is surrounded by the pair of wavy extending portions and the pair of connector portions, wherein each of the wavy extending portions has first wavy slits of wavy lines having a constant waving pattern, and wherein the wavy dummy pattern portion is divided by second wavy slits of wavy lines having the constant waving pattern.

* * * * *